(12) United States Patent
Magnussen et al.

(10) Patent No.: US 7,436,101 B1
(45) Date of Patent: Oct. 14, 2008

(54) MULTISTAGE PIEZOELECTRIC DRIVE

(75) Inventors: Bjoern B. Magnussen, Iserlohn (DE);
Peter C. Varadi, El Cerrito, CA (US);
Dirk J. van Vinckenroye, Bochum (DE)

(73) Assignee: Elliptec Resonant Actuator AG (DE)

( * ) Notice: Subject to any disclaimer, the term of this patent is extended or adjusted under 35 U.S.C. 154(b) by 388 days.

(21) Appl. No.: 11/267,953

(22) Filed: Nov. 4, 2005

Related U.S. Application Data

(60) Provisional application No. 60/624,884, filed on Nov. 4, 2004.

(51) Int. Cl.
*H01L 41/08* (2006.01)
(52) U.S. Cl. .............................. 310/323.16; 310/316.01
(58) Field of Classification Search ............ 310/323.02, 310/323.16, 323.1, 323.01, 328, 323.12, 310/330, 331, 332, 325
See application file for complete search history.

(56) References Cited

U.S. PATENT DOCUMENTS

| | | | | |
|---|---|---|---|---|
| 3,469,119 A | * | 9/1969 | Parkinson | .................... 310/339 |
| 4,400,641 A | * | 8/1983 | Vishnevsky et al. | .... 310/323.02 |
| 4,453,103 A | * | 6/1984 | Vishnevsky et al. | .... 310/323.02 |
| 6,121,717 A | * | 9/2000 | Diefenbach et al. | .... 310/323.16 |

* cited by examiner

*Primary Examiner*—Darren Schuberg
*Assistant Examiner*—Karen B Addison
(74) *Attorney, Agent, or Firm*—Stetina Brunda Garred & Brucker

(57) ABSTRACT

A piezoelectric motor comprising a vibratory element is configured to move a first driven element by vibrations generated by the vibratory element. A second driven element is brought into frictional contact with the first driven element to form a multistage piezoelectric drive system. Alternatively, a selected contacting portion on a support for the first driven element is provided for drivingly engaging the second driven element. The system is configured to also move the second driven element by vibrations generated by the vibratory element, these vibrations being transmitted from the vibratory element into the first driven element and possibly also into the support for the first driven element. The system is preferably configured to move the first and second driven elements independently from each other using only electric signals that are applied to the same one vibratory element.

11 Claims, 13 Drawing Sheets

MULTISTAGE PIEZOELECTRIC DRIVE

CROSS-REFERENCE TO RELATED APPLICATIONS

This application claims priority under 35 U.S.C. § 119(e) from U.S. provisional patent application Ser. No. 60/624,884 filed Nov. 4, 2004, entitled "Piezoelectric Positioning Device", and listing inventors Peter C. Varadi, Björn Magnussen, and Dirk J. van Vinckenroye, the entire disclosure of which is incorporated by this reference as though set forth fully herein.

FIELD OF INVENTION

This invention relates to piezoelectric ultrasonic motors. In particular, this invention relates to multistage vibratory piezoelectric drive systems for moving multiple driven elements, wherein one vibratory element is configured to move more than one driven element by mechanical vibrations that are generated by the vibratory element.

BACKGROUND OF THE INVENTION

Piezoelectric drive systems exist in a variety of shapes and configurations. Piezoelectric drive systems employ a piezoelectric element to generate mechanical vibrations in a vibratory element to incrementally move a driven element. Often, the vibratory element comprises a mechanical resonator to amplify and direct the mechanical vibrations. The vibratory element is typically in frictional contact with the driven element at a selected contacting portion of the vibratory element and the vibrations are selected to incrementally move the driven element in a predetermined direction by the vibrations of the selected contacting portion. Typical frequencies of operation can range from a few Hertz to hundreds of Kilohertz. Driven elements can be pushrods, wheels, cams, etc. One type of piezoelectric drive in various drive configurations is, for example, disclosed in U.S. Pat. No. 6,664,714.

Prior art piezoelectric drive systems do not take into account that a first driven element that is moved by vibrations of a selected contacting portion on a vibratory element can transmit the vibrations from the vibratory element to further structures and also to further driven elements that are in frictional contact with that first driven element so that these transmitted vibrations may move additional driven elements by vibrating further contacting portions. In doing so, one vibratory element can move a first driven element by way of piezoelectric vibrations, and the same vibratory element can independently move a second driven element also by way of piezoelectric vibrations. The resulting motions of the first and second driven elements differ from those that would be obtained through simple mechanical gearing between the first and second driven elements. One of the advantages of such a vibratory multistage, preferably piezoelectric, drive system over prior art is that multiple motions of multiple driven elements may independently be generated using one vibratory element, which may lead to more compact piezoelectric drive systems that comprise fewer parts and are cheaper to produce than prior art piezoelectric drive systems for moving multiple driven elements.

BRIEF SUMMARY OF THE INVENTION

A vibratory, preferably piezoelectric, drive system is provided that comprises more than one driven element. In one preferred embodiment of this system, a preferably piezoelectric vibratory element is in frictional driving engagement with a first driven element to move the first driven element by vibrations of a selected contacting portion on the vibratory element when an electric signal is applied to the vibratory element. Furthermore, a second driven element is in frictional contact with the first driven element and mechanical vibrations generated by the vibratory element are transmitted from the vibratory element into the first driven element so that the vibratory element and the first driven element may cooperate to form a piezoelectric motor for moving the second driven element by way of elliptical, stick-slip, impact or other vibrations in the first driven element. The resulting motion of the second driven element can be different than what would be expected if the first and second driven element were simply geared to each other. In particular, it may be possible to maintain the position of the first driven element while moving the second driven element. Other motions and motion combinations between the vibratory element and the first and second driven elements are believed possible.

In another preferred embodiment of the multistage vibratory, preferably piezoelectric, drive system, the first driven element is movably mounted to a support element or bearing. The vibrations that are generated by the vibratory element are transmitted through the selected contacting portion on the vibratory element to the first driven element and from the first driven element to the support element and in particular to a selected contacting portion on the support element. The selected contacting portion on the support element is in driving engagement with a second driven element and is configured to move the second driven element by way of vibrations of the selected contacting portion on the support element.

There is further provided a method for expanding the capabilities of a piezoelectric drive system that comprises a vibratory element and that is configured to directly move a single, first driven element by mechanical vibrations of a selected contacting portion on the vibratory element. In this method, a second driven element is placed into frictional driving contact with the first driven element. An electric signal is applied to the vibratory element and tuned to cause the vibratory element and the first driven element to cooperate to form a piezoelectric motor for moving the second driven element by way of elliptical, stick-slip, impact or other vibrations.

Alternatively, the method comprises providing a selected contacting portion on a support element or bearing for the first driven element, the selected contacting portion on the support element being configured to drivingly engage the second driven element. An electric signal is then applied to the vibratory element and tuned to cause the vibratory element to vibrate in a manner that is sufficient to excite the selected contacting portion on the support element to vibrate, preferably in elliptical, stick-slip or impact vibrations. The vibrations are hereby transmitted from the vibratory element through the selected contacting portion on the vibratory element into the first driven element and subsequently into the support element for the first driven element, and in particular to the selected contacting portion on the support element. The vibrations of the selected contacting portion on the support element are selected to move the second driven element in incremental steps in a selected direction.

The multistage drive systems that result from these methods are believed to be able to move first and second driven elements independently from each other by exploiting the mechanical vibrations of one and the same vibratory element. In particular, the second driven element need not be in direct contact with the vibratory element. In the case where the first and second driven elements are in direct mutual frictional contact, the drive system can also move the first driven element by exploiting the mechanical vibrations of the vibratory element and have the second driven element be geared to the first driven element by the mutual frictional contact between the first and second driven elements. Preferred embodiments of the multistage vibratory drive system comprise first and second driven elements that are wheels and/or pushrods. Furthermore, preferred embodiments of the multistage vibratory drive system are configured so that one driven element can be stopped independently from the other by selecting the appropriate electric drive signal that is supplied to the vibratory element, and preferably to a piezoelectric element in the vibratory element.

Another preferred multistage vibratory drive system comprises a vibratory element having a first selected contacting portion in driving engagement with a first driven element, the first driven element being movably supported by a support element having a second selected contacting portion that is in driving engagement with a second driven element. The first selected contacting portion preferably vibrates when a first electric signal is applied to the vibratory element so that the first driven element moves in incremental steps in a first direction in response to the vibrations of the first selected contacting portion. Also preferably, the first driven element, the support element, and the second selected contacting portion vibrate in response to the vibrations of the vibratory element when a second electric signal is applied to the vibratory element, and the second driven element moves in incremental steps in a second direction in response to the vibrations of the second selected contacting portion

BRIEF DESCRIPTION OF THE DRAWINGS

These as well as other features of the present invention will become more apparent upon reference to the drawings, in which like numbers refer to like parts throughout, and in which.

DETAILED DESCRIPTION

Figure 1:
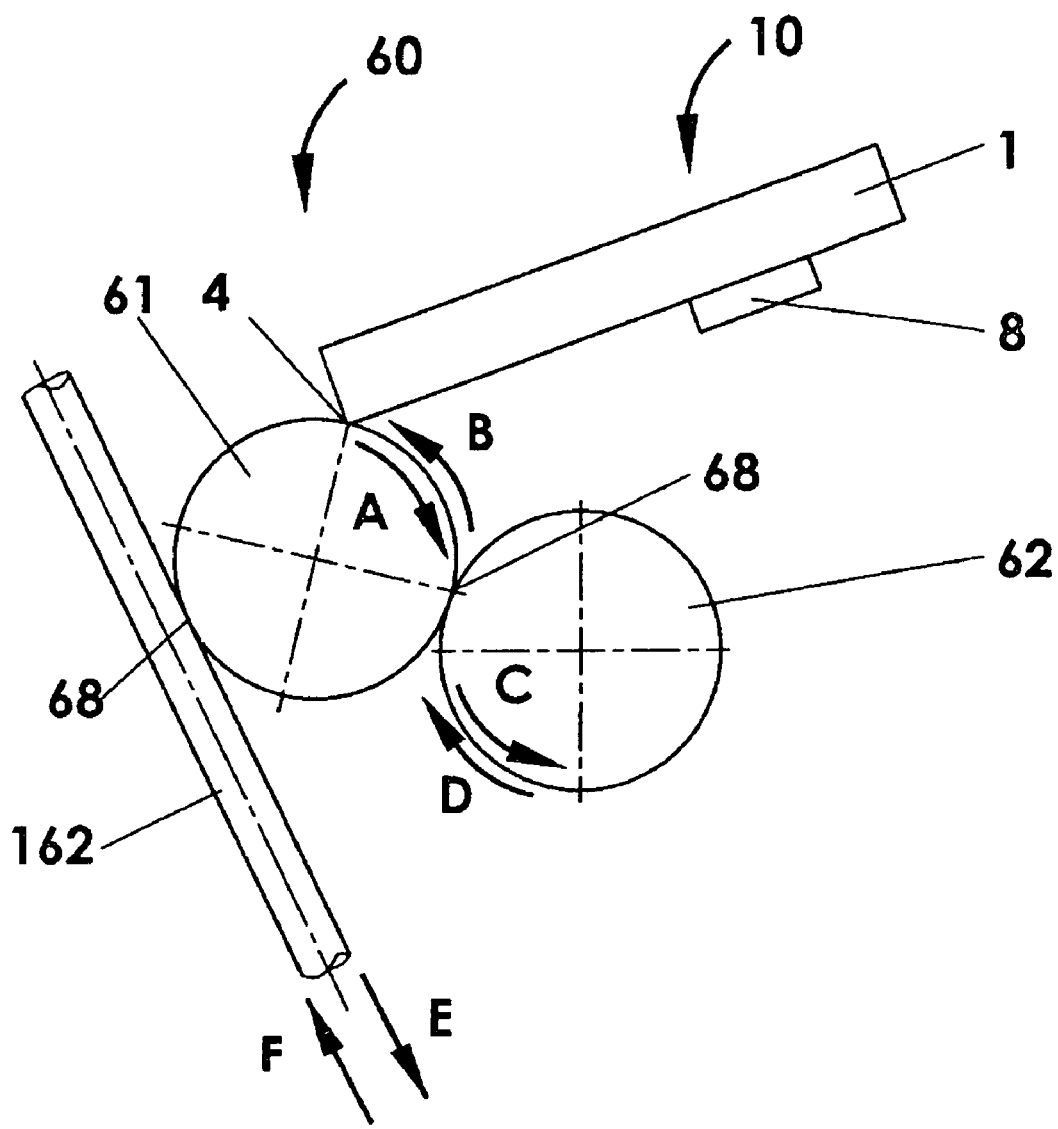
FIG. 1 is a schematic of a multistage piezoelectric drive system.

FIG. 1 illustrates the principles of using a piezoelectric vibratory element 10 with a first driven element 61 and second driven elements 62 or 162 to form a multistage piezoelectric drive system 60. For the purpose of illustration, the vibratory element 10 that is shown in FIG. 1 comprises a resonator 1 and a piezoelectric element 8 that is mounted to the resonator 1. Such a vibratory element 10 is known from U.S. patent U.S. Pat. No. 6,664,714, the entire contents of which are incorporated herein by reference. A complete piezoelectric drive system 60 also typically comprises mounting hardware (such as a flexible spring for mounting the vibratory element 10 to a base or bearings for the driven elements) but such mounting hardware is not shown here for simplicity and clarity. Other vibratory elements 10, such as magnetostrictive and non-resonant vibratory elements 10, that are capable of moving a first driven element 61 by vibrations of a selected contacting portion 4 on the vibratory element may also be used instead of the vibratory element 10 shown in FIG. 1.

In the illustrative example of FIG. 1, the vibratory element 10 is in frictional driving engagement with a first driven element 61 at a selected contacting portion 4 on the vibratory element 10 and preferably, but optionally, resiliently urged into such contact by a resilient member or spring (not shown). Here, the first driven element 61 is, for example, a disk or a wheel. The first driven element 61 is in frictional driving contact with second driven elements 62 and 162 in mutual contact zones 68. Preferably, but optionally, the first and second driven elements 61, 62, 162 are resiliently urged together by a resilient member such as a spring to maintain sufficient frictional contact in the contact zones 68 for holding or for moving the driven elements. In general, only at least one second driven element is required and it may also have different shapes than the ones shown (second driven element 62 is a wheel for rotary motion, second driven element 162 is a pushrod for linear motion). In particular, first and second driven elements can also comprise linear or rotary cams. The configuration of the surface of the cam is selected to impart a desired motion.

In one mode of operation, the first and second driven elements can be operated as a friction gear drive train. For that purpose, the vibratory element 10 is configured to rotate the first driven element 61 in direction of arrow A when a first sinusoidal electric signal of appropriate frequency is applied to the piezoelectric element 8. Simultaneously, the motion of the first driven element 61 along arrow A causes the wheel-type second driven element 62 to move, or rotate, in direction of arrow C, and, similarly, it causes the rod-type second driven element 162 to move, or translate, in direction of arrow F.

Conversely, the vibratory element 10 is further configured to rotate the first driven element 61 in direction of arrow B, which is in the opposite direction of arrow A, when a second sinusoidal electric signal of appropriate frequency is applied to the piezoelectric element 8. Simultaneously, the motion of the first driven element 61 along arrow B causes the wheel-type second driven element 62 to move in direction of arrow D, and, similarly, it causes the rod-type second driven element 162 to move in direction of arrow E. With the exception of the second driven elements 62, 162, vibratory element 10 configurations capable of moving a first driven element 61 by vibrations of a selected contacting portion 4 when a sinusoidal electric signal is applied to the vibration element 10 are disclosed in U.S. Pat. No. 6,664,714. Other vibratory elements 10 known in the prior art use non-sinusoidal electric signals for the same task or they may comprise several piezoelectric elements 8 that are appropriately electrically interconnected, or they may require more than one electrical signal, such as at least two simultaneous but phase-shifted electric signals, for operation. Examples include the piezoelectric arrangements found in U.S. Pat. Nos. 6,121,717, 6,512,321, and 6,717,329, and German Patent DE 198 45 134, the contents of which are incorporated herein by reference. In the friction gear drive train configuration just described, there is desirably no or only negligible slippage between the first and second driven elements in the mutual contact zone 68. The speed ratios between the first and second driven elements are related through the gearing ratios or size ratios between the first and second driven elements, although in practice, slippage in the mutual contact zone 68 may occur if external loads onto the first or second driven elements become too large. Frictional slippage in response to large external load is used in friction clutches. In the depicted embodiment of FIG. 1, the first driven element 61 is rotary, but could also be a translating driven element that is used to rotate or translate the second driven elements 62, 162. Other combinations of first and second driven elements are also possible.

Slippage, or slipping, between two bodies may be detected by comparing the measured speed ratio between two bodies with their intrinsic gearing ratio. Slipping occurs if the speed ratios are not the same. For example, the intrinsic gearing ratio between the two wheels 61, 62 in FIG. 1 is given by the ratio of their diameters. Slipping in the mutual contact zone 68 would obviously occur if the second driven element 62 is not moving while the first driven element 61 is moving. Thus by measuring relative motion or relative speed between the driven elements 61 and 62 or 61 and 162 the occurrence of slippage can be determined.

The vibrations that are generated by the vibratory element 10 are also transmitted into the first driven element 61 and potentially even into the second driven elements 62 or 162. Therefore, even when an electric signal is insufficient to cause the first driven element 61 to move (e.g., to rotate or to translate) relatively to the vibratory element 10 or when the element 61 is restrained in selected movements, it is believed to be possible to select an electric signal to create mechanical vibrations in the vibratory element 10 that are transmitted through the contact portion 4 into the first driven element 61 to cause the second driven elements 62 or 162 to move, i.e. to rotate, revolve, translate, screw, or to perform other desired motions. In other words, the combination of vibratory element 10 and first driven element 61 together forms a new piezoelectric vibratory element 10, or piezoelectric motor, for moving another, second driven element by vibrations of a mutual contacting zone 68 between the first and second driven elements. Alternatively, the combination of vibratory element 10 and first driven element 61 together forms a multi-part vibratory element that functions as a piezoelectric motor for moving a second driven element 62, 162 preferably independently from the first driven element 61.

In a preferred embodiment of the multistage piezoelectric drive system 60, the first driven element 61 forms a mechanical resonator with the vibratory element 10, and/or the first driven element 61 is itself a mechanical resonator, and/or the first driven element 61 comprises a mechanical resonator. In another preferred embodiment of the multistage piezoelectric drive system 60, the second driven element 62, 162 forms a mechanical resonator with first driven element 61 and the vibratory element 10, and/or the second driven element 62, 162 forms a mechanical resonator with the first driven element 61, and/or the second driven element 62, 162 is itself a mechanical resonator, and/or the second driven element 62 comprises a mechanical resonator. The resonators of all these embodiments are excited to vibrate by vibrations of the vibratory element 10 so that the various combinations of vibratory element 10 and first and second driven elements can function as piezoelectric motors for each other. In particular, it is believed possible to transmit vibrations from the vibratory element 10 to the second driven element 62,162 so that the second driven element 62,162 performs vibrations in the region of the mutual contact zone 68 in a manner that is sufficient to move the first driven element 61 in incremental steps in a selected direction. These vibrations are preferably elliptical, impact, or stick-slip vibrations.

It is therefore believed possible to configure a piezoelectric vibratory element 10 to operate in a first driving mode as a piezoelectric vibratory motor for a first driven element 61, and to further configure the combination of piezoelectric vibratory element 10 and first driven element 61 to operate in a second driving mode as a piezoelectric vibratory motor for second driven elements 62 or 162. These first and second driving modes preferably create motions of the first and second driven elements that are different from the motions obtained in a purely geared system where the motions of the first and second driven elements are directly correlated by the gearing ratio.

There are thus provided first and second driving modes of a multistage piezoelectric drive system 60, namely the first mode of causing a first driven element 61 to move with respect to a vibratory element 10 and the second mode of causing a second driven element 62 or 162 to move with respect to the first driven element 61 that is not moving with respect to the vibratory element 10, wherein both driving modes are caused by electric signals that are applied to the piezoelectric element 8. It is further believed to be possible to combine the two driving modes to cause situations where all driven elements move with respect to each other and relatively to the vibratory element 10 so that the motions of the first and second driven elements are not correlated as would be expected from their intrinsic gearing ratios. In particular, it may, for example, be possible to rotate the first driven element 61 in direction of arrow A and the second driven elements 62, 162 in directions of arrows D and E, respectively, using the same vibratory element 10 to achieve all motions and modes of operation.

As used herein, the term 'moving' a driven element preferably implies motion of the driven element in distinct incremental steps in one direction in order to distinguish the term 'moving' the driven element from the term 'vibrating' the driven element. For example, there are piezoelectric motors that are commonly known as micropush motors and that move a driven element in a selected direction in small incremental steps. In one type of micropush piezoelectric motor, a vibratory element 10 generates elliptical vibrations of a selected contacting portion 4 on the vibratory element 10. Preferably each time the selected contacting portion 4 completes a full ellipse, the first driven element 61 is moved, i.e. transported, by one incremental step in a selected direction due to the varying frictional contact forces at the selected contacting portion 4 during completion of the ellipse. The next time the selected contacting portion 4 completes the same full ellipse, the selected contacting portion 4 moves the first driven element 61 in another incremental step in the same selected direction. Piezoelectric motors of this type are, for example, disclosed in U.S. Pat. No. 6,664,714. The contact between the vibratory element 10 and the first driven element 61 at the contacting portion 4 may be temporary lost 10 for short periods of time within one incremental step to support executing the incremental step.

Another type of a micropush motor for moving a driven element in incremental steps is based on quickly moving the selected contacting portion 4 on the vibratory element 10 in one direction and then slowly moving it in the opposite direction, or vice versa. When the selected contacting portion 4 moves slowly, the driven element feels a different driving force, and preferably sticks to the selected contacting portion 4, than when the selected contacting portion 4 moves quickly and the driven element preferably slides or slips with respect to the selected contacting portion 4, preferably due to the inertia of the driven element. Repeating this stick-slip process moves the driven element in increments in a selected direction. This type of selected contacting portion 4 vibration is termed stick-slip vibration and is illustrated by U.S. Pat. No. 6,717,329, the complete contents of which are incorporated herein by reference.

Further types of micropush motors have a vibratory element 10 to cause vibrations of a selected contacting portion 4 on a vibratory element 10 so that the selected contacting portion 4 repeatedly impacts a first driven element 61 and moves it in a selected direction by these repeated impacts. Such impact-type vibrations offer a way to create further preferred variations of multistage piezoelectric drive systems 60.

When stick-slip or impact vibrations of a selected contacting portion 4 or of a mutual contact zone 68 that lies between two driven elements are used to move a driven element, one often relies on the inertia of that driven element to oppose the motion of the selected contacting portion 4 or mutual contact zone 68, which leads to slippage at the selected contacting portion 4 or mutual contact zone 68 and thus to an incremental step of the driven element in a selected direction. Similarly, elliptical vibrations of a selected contacting portion 4 or of a mutual contact zone 68 can cooperate with the inertia of the driven element to incrementally move the driven element.

There is thus provided a multistage vibratory piezoelectric drive system 60 for causing relative motion between a vibrating element 10 and first and second driven elements 61/62 or 61/162. The drive system 60 comprises the vibratory element 10 and at least the first and second driven elements. The vibrating element 10 preferably has a piezoelectric element 8 drivingly connected to a resonator 1. The vibratory element 10, and preferably the resonator 1, has a selected contacting portion 4 for drivingly engaging the first driven element 61. The first and second driven elements are preferably separate but in frictional contact with each other at a mutual contact zone 68. The vibratory element 10 causes relative motion between the vibratory element 10 and the first driven element 61 in a first direction when a first electric signal is applied to the vibratory element 10. It is believed possible to configure the vibratory element 10 and the first and second driven elements to further cause relative motion between the first and second driven element in a second direction when a second electric signal is applied to the vibratory element 10. The first and second electric signals are preferably different. Also preferably, but not necessarily, there is no relative motion between the vibratory element 10 and the first driven element 61 when the second electric signal is applied to the vibratory element 10, i.e. the vibratory element 10 and the first driven element 61 together form a multi-part vibratory unit that functions as a piezoelectric motor for the second driven element 62 or 162.

The electrical signals for causing the two or more modes of operation of the multistage piezoelectric drive system 61 preferably have different fundamental frequencies. The fundamental frequency of a signal is the frequency with the highest amplitude in a spectral decomposition of the electric signal. For example, superimposing a pure sinusoidal electric signal with sufficiently small noise or with additional frequencies with sufficiently small spectral amplitudes does not change the fundamental frequency of the electric signal.

In a preferred embodiment of the multistage piezoelectric drive system 60, the electric signals for causing the desired motions are sinusoidal. In a further preferred embodiment of the multistage piezoelectric drive system 60, the electric signals for moving the driven elements are PWM (pulse width modulated) signals.

It is preferable to configure the multistage piezoelectric drive system 60 so that there are electrical signals that cause relative motion between the vibratory element 10 and the first driven element 61 in opposing directions. It is further preferable that the multistage piezoelectric drive system 60 is capable of independently moving the first and second driven elements into predetermined positions.

In a preferred embodiment of the multistage piezoelectric drive system 60, the vibratory element 10 is configured to move the first driven element 61 by elliptical vibrations of the selected contacting portion 4 of the vibratory element 10. The elliptical vibration is preferably achieved by applying a fundamentally sinusoidal electric signal to the vibratory element 10. In this preferred embodiment of the multistage piezoelectric drive system 60, the first vibratory element 10 and the first driven element 61 are preferably further configured to move the second driven element 62 or 162 with stick-slip vibrations in the first driven element 61 at the mutual contact zone 68 with the second driven element 62 or 162. The stick-slip vibrations are preferably achieved by applying a fundamentally skewed triangular electric signal to the vibratory element 10.

In another preferred embodiment of the multistage piezoelectric drive system 60, the vibratory element 10 is configured to move the first driven element 61 by stick-slip vibrations of the selected contacting portion 4 of the vibratory element 10. The stick-slip vibrations are preferably achieved by applying a fundamentally skewed triangular electric signal to the vibratory element 10. In this preferred embodiment of the multistage piezoelectric drive system 60, the first vibratory element 10 and the first driven element 61 are preferably further configured to move the second driven element 62 or 162 by elliptical vibrations of the mutual contact zone 68 on the first driven element 61. The elliptical vibrations are preferably achieved by applying a fundamentally sinusoidal electric signal to the vibratory element 10.

Figure 2:
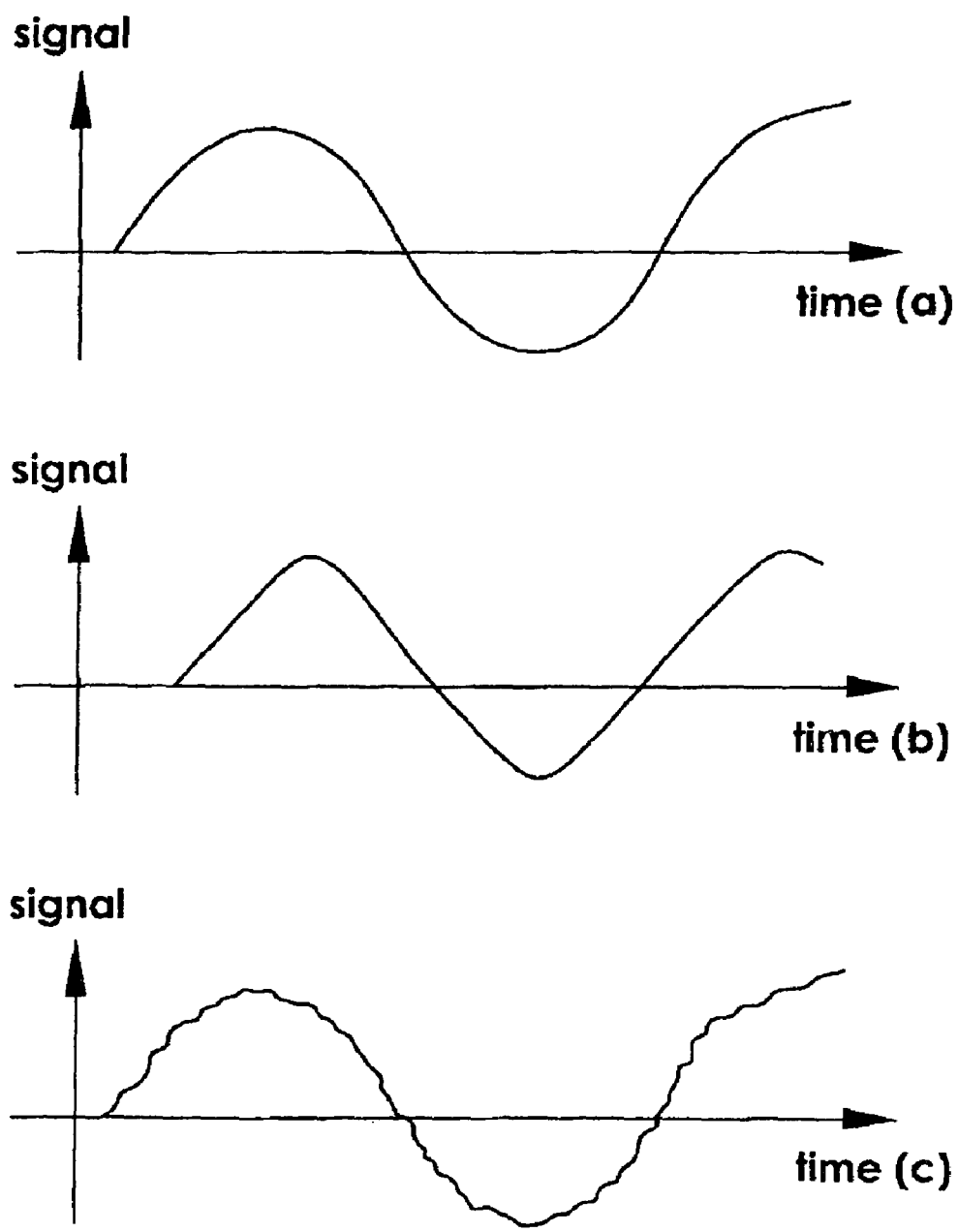
FIGS. 2a, 2b, and 2c illustrate fundamentally sinusoidal electric driving signals.

Fundamentally sinusoidal signals are explained in relation to FIG. 2. FIG. 2a illustrates a pure sine function. FIG. 2b shows a slightly modified sine function with a more triangular shape. FIG. 2c shows a noisy sine function. A person skilled in the art would recognize that these and other functions are fundamentally sinusoidal if they serve the purpose of creating elliptical vibrations in a selected contacting portion for moving a driven element. Fundamentally sinusoidal functions may also comprise a multitude of superimposed sine-functions, each having a frequency that is an integer multiple of a base frequency—a specific example of such a function is a square wave function—as long as it serves the purpose of creating elliptical vibrations at a selected contacting portion for moving a driven element.

Figure 3:
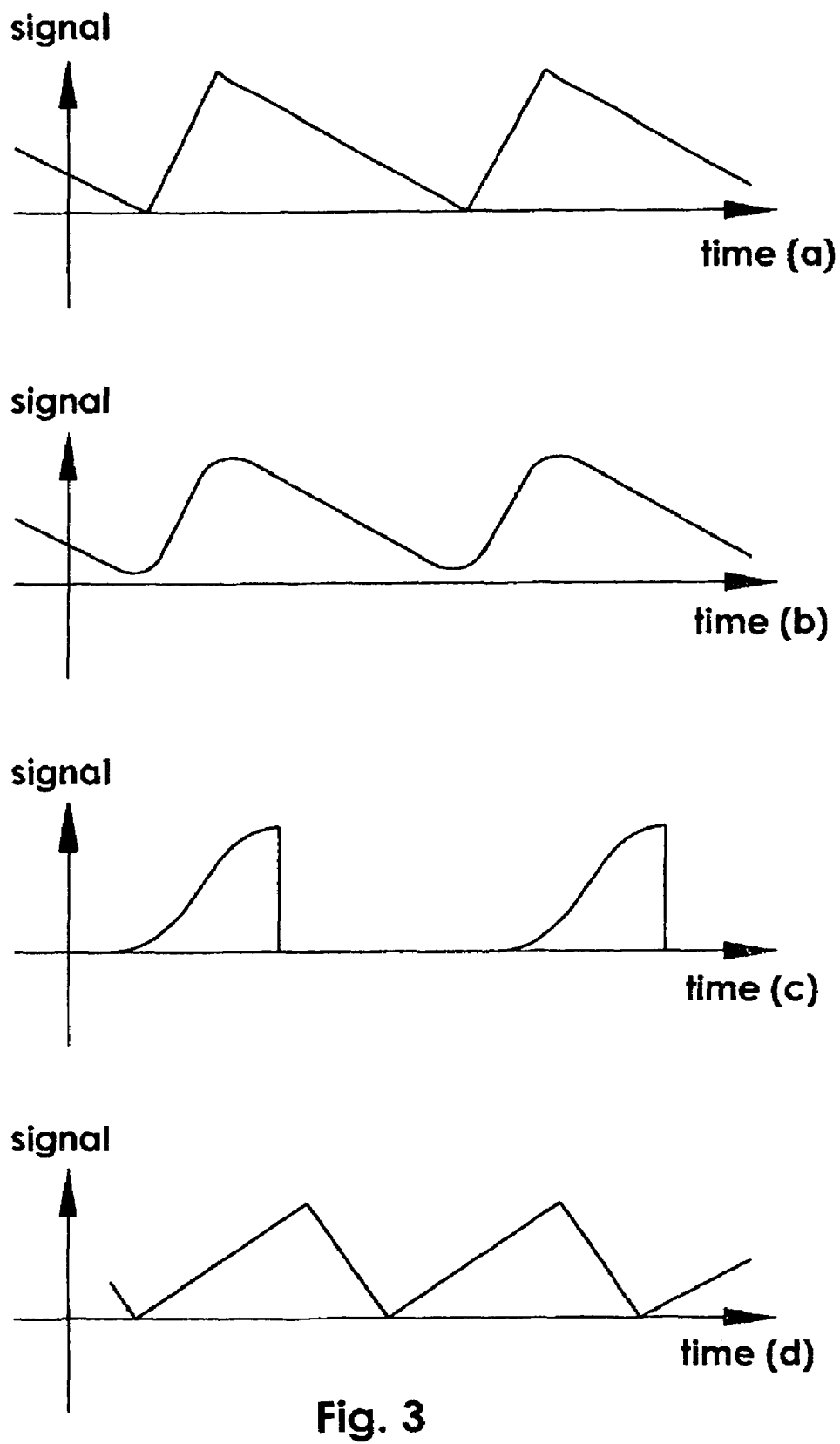
FIGS. 3a, 3b, 3c, and 3d illustrate fundamentally skewed triangular electric driving signals.

Fundamentally skewed triangular signals are explained in relation to FIG. 3. FIG. 3a illustrates a pure skewed triangular function wherein the increasing and the decreasing portions of the function are each linear but have different slopes. The triangular function is thus skewed to one side. FIG. 3b shows a slightly modified skewed triangular function with a more rounded shape. A person skilled in the art would recognize that these and other functions are fundamentally skewed triangular if they serve the purpose of creating stick-slip vibrations in a selected contacting portion for moving a driven element.

FIG. 3d illustrates a skewed triangular function that is skewed to the opposite side compared to the function shown in FIG. 3a. The electric signal of FIG. 3d may be used to cause a selected contacting portion to move a driven element in incremental steps in a different, and preferably opposing, direction, than when the electric signal of FIG. 3a is used.

FIG. 3c illustrates how a fundamentally skewed triangular electrical signal may be generated by using a truncated sinusoidal signal. In a piezoelectric drive system that is configured to move a first driven element 61 with elliptical vibrations of a selected contacting portion 4 on a vibratory element 10, the method of truncating a sinusoidal signal is believed to be particularly useful for generating stick-slip vibrations in a selected contacting portion 4 for driving a first driven element 61 or for generating stick-slip vibrations in a mutual contact zone 68 between the first driven element 61 an a second driven element 62, 162 for moving the second driven element 162, preferably independently from the first driven element 61.

There is thus provided a method for using a piezoelectric or other vibratory element 10 to move first and second driven elements, the vibratory element 10 having a selected contacting portion 4 for drivingly engaging the first driven element 61 and the first driven element 61 being in frictional driving engagement with the second driven element 62 or 162 at a mutual contact zone 68 between the first and second driven elements. The method comprises applying a first electric signal to the vibratory element 10 to vibrate the selected contacting portion 4 in a manner that is sufficient to move the first driven element 61 with respect to the vibratory element 10. The method further comprises applying a second electric signal to the vibratory element 10 to vibrate the mutual contact zone 68 in a manner that is sufficient for moving the second driven element 62 or 162 with respect to the first driven element 61.

Preferably, but not necessarily, the second electric signal is selected so that the vibratory element 10 and the first driven element 61 do not move with respect to each other when the second electric signal is applied to the vibratory element 10. Furthermore preferably, but not necessarily, the first electric signal is selected so that the first and second driven elements do not move with respect to each other when the first electric signal is applied to the vibratory element 10.

There is thus provided a method for converting a single-stage elliptical-vibration piezoelectric motor comprising a vibratory element 10 having a selected contacting portion 4 in driving engagement with a first driven element 61 into a multistage piezoelectric drive system 60 having first and second driven elements by placing the second driven element 62 or 162 in frictional driving engagement with the first driven element 61 at a mutual contact zone 68. The second driven element 62 or 162 is preferably moved in incremental steps in a selected direction, preferably independently from the first driven element 61, by applying a fundamentally skewed triangular electric signal to the vibratory element 10 to cause stick-slip vibrations in the first driven element 61 at the mutual contact zone 68.

There is also provided a method for converting a single-stage stick-slip-vibration piezoelectric motor comprising a vibratory element 10 having a selected contacting portion 4 in driving engagement with a first driven element 61 into a multistage piezoelectric drive system 60 having first and second driven elements by placing the second driven element 62 or 162 in frictional driving engagement with the first driven element 61. The second driven element 62 or 162 is preferably moved, preferably independently from the first driven element 61, by applying a fundamentally sinusoidal electric signal to the vibratory element 10, which is believed to cause elliptical vibrations in the first driven element 61 and in particular at the mutual contact zone 68.

It is believed possible to configure a multistage piezoelectric drive system 60 having first and second driven elements that are frictionally geared together such that the frictional driving force on the second driven element 62, 162 is reduced or removed when the mutual contact zone 68 between the first and the second driven element vibrates. Due to such friction-reducing vibrations, the frictional gearing between the first and second driven elements can be temporarily suspended while the vibratory element 10 is generating the necessary vibrations to cause the contacting zone 68 to vibrate appropriately. It is further believed possible that these friction-reducing vibrations of the mutual contacting zone 68 can be generated simultaneously with the vibrations of the contacting portion 4 on the vibratory element 10 that move the first driven element 61.

Figure 4:
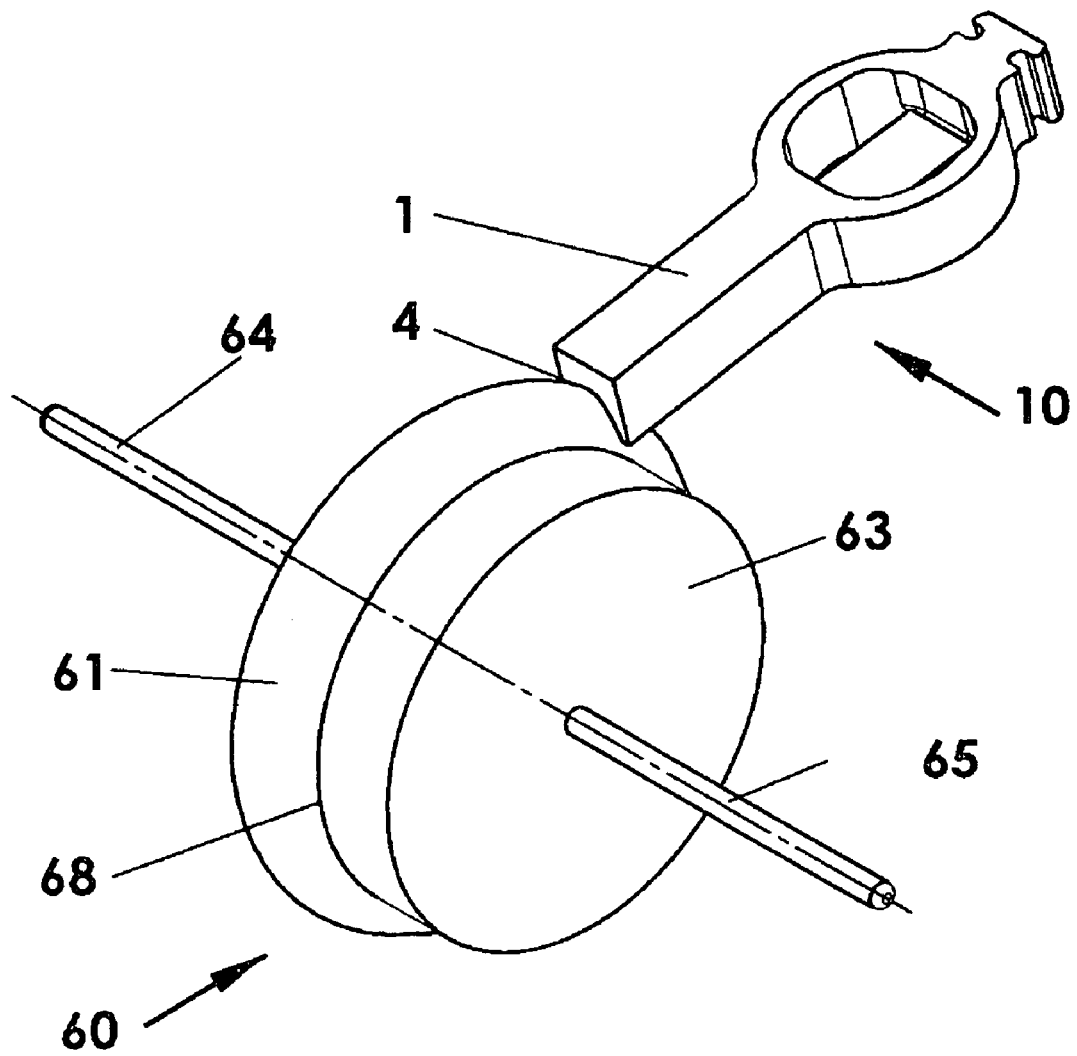
FIG. 4 is a preferred embodiment of a multistage piezoelectric drive system.

FIG. 4 shows another preferred embodiment of a multistage piezoelectric drive system 60. In this embodiment, a vibratory element 10 has a selected contacting portion 4 in direct frictional driving contact with a first driven element 61, which in turn is in frictional driving contact with a second driven element 63, the first and second driven elements having a mutual contact zone 68. The vibratory element is shown as comprising a resonator 1. Vibratory elements of this type are known from U.S. Pat. No. 6,664,714. The piezoelectric element 8 and any mounting hardware are not shown for simplicity.

In this preferred embodiment, the first driven element 61 is a disk that is attached to an axle 64 at the disk center. The second driven element 63 is also a disk and is attached to an axle 65 at the disk center. First and second driven elements 61 and 63 and axles 64 and 65 are all coaxial.

Disks 61 and 63 are in contact along a side surface of each disk, i.e. at the mutual contact zone 68. When there is no slippage between the disks 61, 63, the disks 61 and 63 and axles 64 and 65 form a single unit that may be moved by vibrations of the vibratory element 10. Preferably, but optionally, the disks 61, 63 are resiliently urged together by resilient members, such as springs or a magnetic coupling element (not shown). It is believed that when a fundamentally sinusoidal or skewed triangular electric signal is applied to the vibratory element 10, elliptical and/or stick-slip and/or impact vibrations may be generated in the contact surface between disks 61 and 63, which causes the disks 61 and 62 to move with respect to each other, i.e., to rotate independently about the respective axles 64 and 65.

There is thus provided a multistage piezoelectric drive system 60 that has first and second driven elements that can be moved as a unit or, alternatively, can be independently moved by one and the same vibratory element 10 depending on the electric signal that is applied to the vibratory element 10. There is thus provided a multistage piezoelectric drive system 60 that has a functionality that is similar to the function of a differential gear train. One advantage of such a piezoelectric drive system 60 embodiment over classical cogged differential gear trains is that this piezoelectric drive system 60 comprises intrinsic friction clutches between the first and the second driven elements 61, 63 and also between the first driven element 61 and the vibratory element 10. This property may constitute a safety feature to protect the drive system 60 from potentially damaging external loads on the drive system 60.

In a further preferred embodiment of the multistage piezoelectric drive system 60, a second driven element 62, 162, 63, or other second driven element is moved to a predetermined position that is independent of the position of the first driven element 61 by partially exploiting the merits of the friction gear train between the first and second driven elements. In this preferred embodiment, a vibratory element 10 has a selected contacting portion 4 for engaging a first driven element 61 to form a piezoelectric motor. This piezoelectric motor first accelerates the first driven element 61 sufficiently slowly and gradually in a first direction so that the second driven element 62, 162, 63, or other second driven elements follow suit due to the mutual friction gearing between the first and second driven elements. Next, the piezoelectric motor formed by the vibratory element 10 and the first driven element 61 accelerates the first driven element 61 sufficiently quickly in a direction that is opposite to the first direction so that the second driven element preferably cannot follow suit by way of the mutual friction gearing, i.e., sliding occurs between the first and second driven elements. By repeating the process, the first and second driven elements can be brought into independent positions using the same vibratory element 10. Depending on the acceleration directions of the first driven element 61, the second driven element can be moved in different selected directions in incremental steps. It is advantageous to combine incremental steps of different sizes and/or in different directions to finely tune the final position of the second driven element independently of the position of the first driven element 61.

In general, deceleration or braking of a moving driven element is achieved by accelerating the driven element in a direction that is opposite to the motion of the driven element.

Figure 9:
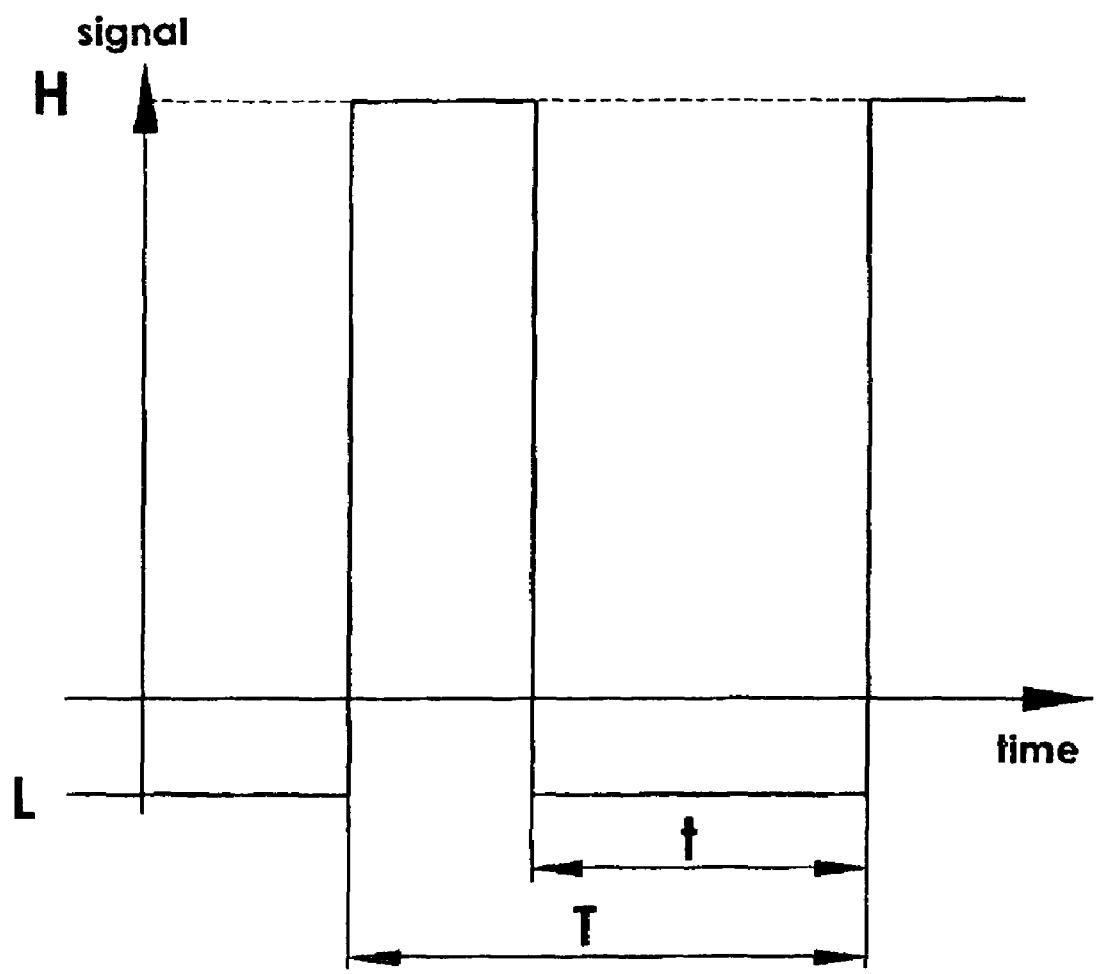
FIG. 9 shows a portion of a pulse width modulated (PWM) signal.

FIG. 9 shows a pulse-width modulated (PWM) signal to discuss how to accelerate a driven element in a preferred manner in a vibratory drive system 60, wherein the vibratory drive system 60 has a mode of operation where a pulse-width modulated (PWM) signal is sufficient to move that driven element. U.S. Pat. No. 6,664,714 discloses piezoelectric motor configurations that could be operated with pulse-width modulated (PWM) electric signals. Of the entire PWM signal, one portion with duration T is shown. This portion of the signal is assumed to be repeated as often as needed without interruption to move the driven element a predetermined distance.

The PWM signal has a low portion (at signal level L) of duration T minus t, and a high portion (at signal level H) of duration t. High and Low levels may also be reversed. Changing the base frequency 1/T can change the velocity of the driven element. If the driven element is moved due to resonant vibrations in the drive system 60, changing the base frequency 1/T is a preferred method for changing the velocity of the driven element, and therefore for accelerating the driven element in a selected direction.

A further preferred method for changing the velocity of the driven element, and therefore to accelerate the driven element in a selected direction is to modify the duty cycle ratio t/T. Maximal velocity of the driven element in a selected mode of operation is typically reached for a duty cycle of about 50%. U.S. Pat. No. 6,512,321 discloses a vibratory motor where a duty cycle ratio other than 50% results in maximal velocity of the driven element in a selected direction. A duty cycle ratio of 0% or 100% typically causes the driven element to stop. Different velocities, and in some instances even different directions of motion, can thus be achieved by modifying the duty cycle t/T. For example, in a preferred modulation of the PWM electric signal that is applied to the vibratory element 10, the duty cycle ratio is increased from 0% to about 50%, preferably in a predetermined manner and either continuously or in several steps, in order to accelerate the driven element in a selected direction at a rate that is commensurate with the increasing duty cycle ratio. If the duty cycle ratio is then immediately reset to 0%, the driven element correspondingly stops, preferably immediately, which can lead to a period of slipping between two driven elements 61, 62 or between a driven element 61 and a vibratory element 10. Also preferably, the duty cycle ratio can be varied by starting from 100% or another value and moving towards 50% or another value, or in any other combination as is necessary for generating a desired acceleration profile for the driven element.

The use of a modulated PWM electric control signal for a vibratory element 10 to first slowly accelerate a first driven element 61 and then to quickly decelerate it in order to temporarily cause slippage between the first driven element 61 and a second driven element 62 is explained in relation to the curves shown in FIGS. 10*a*-10*e*.

Figure 10:
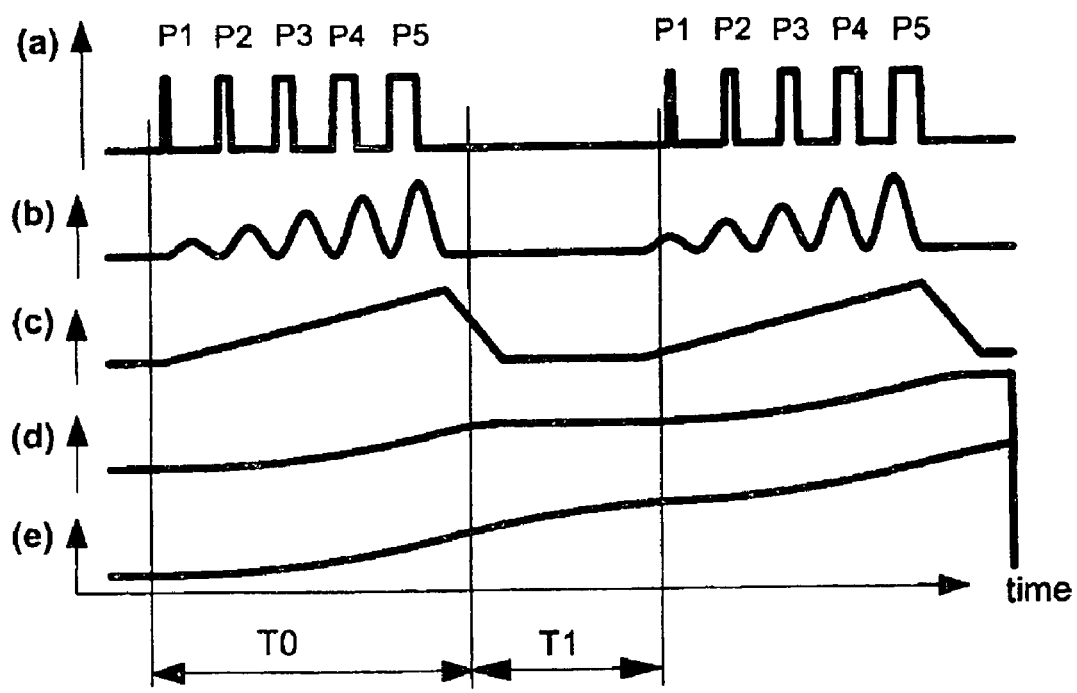
FIGS. 10a-10e show various curves and electric signals in relation to a preferred method of operation of a multistage vibratory drive system.

The curve in FIG. 10*a* is an example of a PWM electric control signal over time that can be applied to the vibratory element 10. The PWM signal is preferably generated by a microcontroller that is configured to control the vibratory drive system. In this example, the PWM signal comprises a series of pulses P1 through P5 that have gradually increasing duty cycle ratios. Only five pulses are shown, but the series of pulses could also have more pulses or fewer pulses for a finer or coarser control over the rate of increase of the duty cycle ratio. The first pulse P1 in the series shown has a duty cycle ratio of about 8%. The last pulse P5 in this series has a duty cycle ratio of about 50%. The duty cycle ratios of the intermediate pulses P2, P3, and P4 are evenly distributed in between. Other duty cycle ratios for the first and the last pulses of the series and other duty cycle ratio distributions for the intermediate pulses of the series are also possible. The duty cycle ratios are preferably selected to achieve a desired acceleration profile of a driven element. The pulse series has a total duration T0.

If the vibratory element 10 comprises a mechanical resonator 1, the pulse series of the PWM signal shown in FIG. 10*a* causes the selected contacting portion 4 of the vibratory element 10 to vibrate in a sinusoidal manner with increasing amplitude during the duration T0, as is illustrated by the first portion of curve of FIG. 10*b*, to move the first driven element 61 with increasing speed. Alternatively, the sinusoidal curve of FIG. 10*b* may also be viewed as the analog equivalent of the digital PWM control signal for the purpose of moving the first driven element 61 with variable speed in response to the varying amplitude of the sinusoidal control signal shown in FIG. 10*b*.

It has been observed that a pulse series such as the one shown in FIG. 10*a*, and preferably a pulse series comprising more pulses than shown, causes the first driven element 61 to accelerate in a selected direction. As a result, the velocity of the first driven element 61 increases gradually, and preferably but not necessarily linearly, during the duration T0, which is illustrated by the first portion of the curve in FIG. 10*c*.

The curve of FIG. 10*d* is the integral of FIG. 10*c* and illustrates the position or orientation of the first driven element in accordance with the velocity profile of FIG. 10*c*. The velocity profile of FIG. 10*c* is thus selected to move the first driven element by a desired distance.

If the first driven element 61 is in direct frictional driving contact with a second driven element 62, i.e., if the first and second driven elements 61, 62 are geared together by friction, e.g., as shown in the embodiment of FIG. 1, then the position or orientation of the second driven element 62 is commensurate with the position or orientation of the first driven element 61 for the duration T0, provided that the accelerations of the first and second driven elements 61, 62 are sufficiently small to avoid slippage in the mutual contact zone 68 between the first and second driven elements 61, 62. In other words, for the duration T0, the position or orientation of the second driven element 62 as illustrated by the curve in FIG. 10e has a defined relationship to the position or orientation of the first driven element 61 as illustrated by the curve in FIG. 10d. For example, if the first and second driven elements 61, 62 are wheels of equal diameter that roll on each other, said defined relationship is that the difference of the rotation angles of driven elements 61, 62 remains constant during the duration T0. If said wheels have unequal diameters, said difference of the rotation angles varies linearly during period T0.

As shown in FIG. 10c, the velocity of the first driven element 61 is quickly reduced at the end of duration T0, preferably such that the first driven element 61 stops completely, within a period of time that is preferably shorter than T0. This can be achieved by setting the digital PWM control signal, or the analog sinusoidal control signals, or other control signal, to a fixed level, e.g., to a high or a low level, as illustrated by the signals in FIGS. 10a and 10b, or by turning the control signal off at the end of duration T0. The first driven element 61 is decelerated sufficiently quickly so that slippage occurs temporarily between the first and second driven elements 61, 62. For at least a portion of a duration T1 that follows duration T0, there is no defined relationship between the positions or orientations of the driven elements 61, 62 due to said slippage as illustrated by the curves in FIGS. 10d and 10e, i.e., the first and second driven elements have moved relative to each other by an incremental step whose distance may be selected by the velocity profile of the first driven element. After the deceleration phase of the first driven element 61, the frictional gearing between the driven elements 61, 62 resumes and so does the defined relationship between the positions or orientations of the driven elements 61, 62. The entire process is then repeated after the duration T1, which is preferably larger than T0, to cause further incremental steps of the second driven element 62 in the same direction relatively to the first driven element 61 due to repeated slippage in the mutual contact zone 68.

There is thus provided a method for generating vibrations of a vibratory element 10 of varying intensity for moving a first driven element 10 with varying speed by modulating the duty cycle ratio of an applied PWM control signal. The modulation of the duty cycle ratio is preferably selected to accelerate the first driven element 61 sufficiently slowly, preferably over the course of a multitude of pulses of the PWM control signal, preferably with more than 2 and more preferably with 5 or more pulses, so that a second driven element 62 that is in frictional engagement with the first driven element 61 is moved without slippage. The modulation of the duty cycle ratio is preferably further selected to decelerate the first driven element 61 sufficiently quickly, preferably over the course of a single pulse of the PWM control signal, so that the first and second driven elements 61, 62 temporarily move with respect to each other due to slippage in the mutual contact zone 68. As a result, the first ad second driven elements can be move into independent final positions or orientations.

It is preferred that the vibratory element 10 comprises a piezoelectric element 8 that expands and contracts once for every pulse of the electric control signal that is applied to the piezoelectric element 8.

In a preferred variation of the control method, the velocity profile of the first driven element 61 is varied by modulating the base frequency 1/T of the electric control signal. This approach is particularly useful when a resonant vibratory element 10 is used to generate the vibrations. Suitable base frequencies 1/T are preferably selected sufficiently close to a resonance frequency of the vibratory element 10 to cause the first driven element 61 to move.

In a further preferred variation of the control method, the control signal is selected so that the first driven element 61 first moves in a first direction by a first distance and then moves opposite to the first direction by preferably the same distance so that there is no or little total displacement of the first driven element 61 at the end of this motion cycle. Meanwhile, the control signal is also selected so that the second driven element 62 moves relatively to the first driven element 61 at least in part due to slippage so that the second driven element 62 does preferably not return to the same position or orientation at the end of the motion cycle. As a result, the second driven element 62 can be moved into another position or orientation while keeping the first driven element 61 close to a reference position or orientation.

Figure 5:
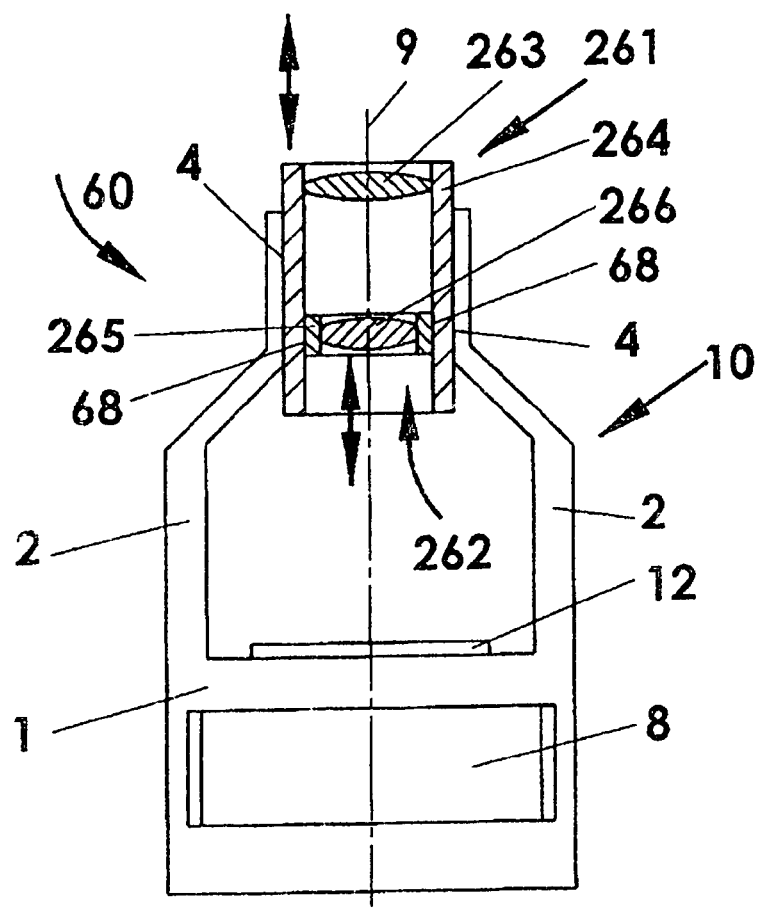
FIG. 5 is an embodiment of a zoom/auto focus multistage piezoelectric drive system.
Figure 6:
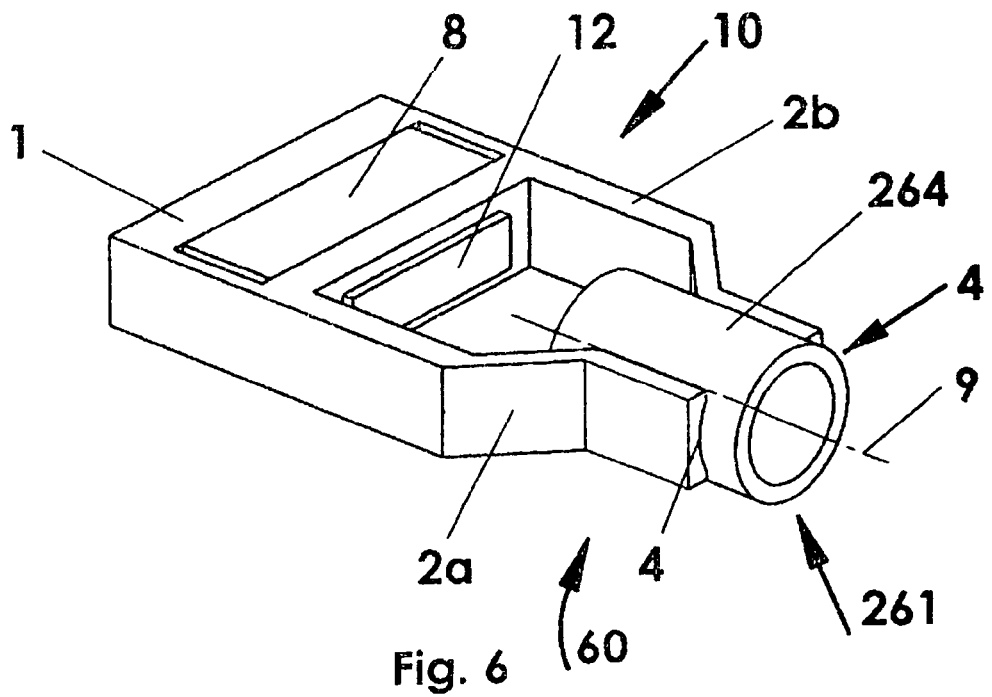
FIG. 6 is a perspective view of the multistage piezoelectric drive system of FIG. 5.

FIG. 5 shows a further embodiment of a multistage piezoelectric drive system 60. The embodiment comprises a piezoelectric vibratory element 10, a first driven element 261, and a second driven element 262. The vibratory element 10 comprises a forked resonator 1 with two opposing legs 2, each leg 2 having a selected contacting portion 4 that faces the contacting portion 4 of the other leg 2, both contacting portions 4 together holding the first driven element 261 in frictional driving engagement. Preferably, the vibratory element 10 is configured to linearly move the first driven element 61 preferably along the axis 9 when an appropriate electric driving signal is applied to the vibratory element 10. The first and second driven elements 261 and 262, respectively, are shown in a cross-sectional view to reveal that the driven elements 261, 262 have an annular construction in this embodiment. FIG. 6 shows the multistage piezoelectric drive 60 of FIG. 5 in a perspective view.

The vibratory element 10 also includes a piezoelectric element 8 that, for example, is held within an opening of the resonator 1. The vibratory element 10 is configured to cause the legs 2 to vibrate when an electric signal is applied to the piezoelectric element 8. The electric signal is selected to cause the legs 2 and the selected contacting portions 4 to vibrate in a manner that is sufficient to move the first driven element 261 along the longitudinal axis 9 using the inertia of the first driven element 261.

In this example, the first and second driven elements 261 and 262, respectively, comprise two concentric coaxial sliding tubes with at least one tube moving relative to the other tube. The first driven element 261 preferably comprises a first tubular cylinder 264. The second driven element 262 comprises a second tubular cylinder 265 nested inside the first cylinder 264. The first cylinder 264 is in frictional driving engagement to the second tubular cylinder 265 and can move the second cylinder 265 using the first and second cylinders' inertias when an electric signal is applied the vibratory element 10. That electric signal is selected to cause relative motion between the first cylinder 264 and the second cylinder 265 due to vibrations of the mutual contact zone 68.

It is thus believed to be possible to independently move the two tubular cylinders 264, 265 by applying different electric signals to the piezoelectric element 8 of the vibratory element 10. If the tubular cylinders 264, 265 are each fitted with optical elements 263 and 266, respectively, such as optical lenses, a compact focus/zoom lens with optical axis 9 can be built. In the case of a forked resonator 1 as shown in FIGS. 5-6, it may be advantageous to place an imaging device 12, for example CCD chip, on the axis 9 directly on the resonator 1 in between the legs 2.

In more detail, the forked resonator 1 shown in FIGS. 5-6 has opposing legs 2a, 2b which are mirror images of each other. A distal end of the legs 2a, 2b are spaced apart a distance sufficient to hold the first tubular cylinder 261. Each selected contacting portion 4 is preferably, but optionally, formed as a recess in the distal end of each opposing leg, with the shape of the recess conforming to the mating portion of the first cylinder 261. While the elements 261 and 263 are each described as cylindrical, other cross-sectional, tubular shapes can be used, such as quadrilateral, oval, etc., and the shape of recess 4 will vary accordingly.

Opposite the distal end of legs 2a, 2b, the legs fasten to a base which contains the piezoelectric element 8. The base is preferably, but optionally formed so that the piezoelectric element 8 is located in a cavity in the base, with the element 8 having a longitudinal axis perpendicular to the axis 9, causing the legs 2 to move relative to each other. Thus, the major vibratory axis of the piezoelectric element 8 is located orthogonal to the axis 9. Alternatively, the piezoelectric element 8 could have its major vibratory axis along the axis 9, but then the imaging device 12 will be subject to greater motion and may require vibration isolation. Even when the major vibration axis of the piezoelectric element 8 is parallel to the imaging device 12 (and orthogonal to the optical axis 9), vibration isolation may be useful to stabilize the imaging device 12. Various vibration isolation techniques can be used, including vibration absorbing or vibration insulating structures and materials. The influence of vibrations on image quality may not be an issue when taking still images if the vibration device 60 is given sufficient time to come to rest after the electric signal to the vibratory element 10 has been turned off.

There are thus provided multistage piezoelectric drive systems 60 that move a first driven element 61 (or other first driven element) in a first direction when a first electric signal is applied to the vibratory element 10 and further move a second driven element 62, 162, 63 (or other second driven element) in a second when a first electric signal is applied to the vibratory element 10. It is advantageous and preferable to configure these piezoelectric drive systems 60 to further move the first driven element 61 in a third direction when a third electric signal is applied to the vibratory element 10, and to move the second driven element in a fourth direction when a fourth electric signal is applied to the vibratory element 10. The first and third directions are preferably opposite. The second and fourth directions are preferably opposite. It is preferable that by selecting only the electric signal to the vibratory element 10, the directions of motion and the amounts of motion, respectively, of the first and second driven elements, respectively, can be selected independently from each other.

Figure 7:
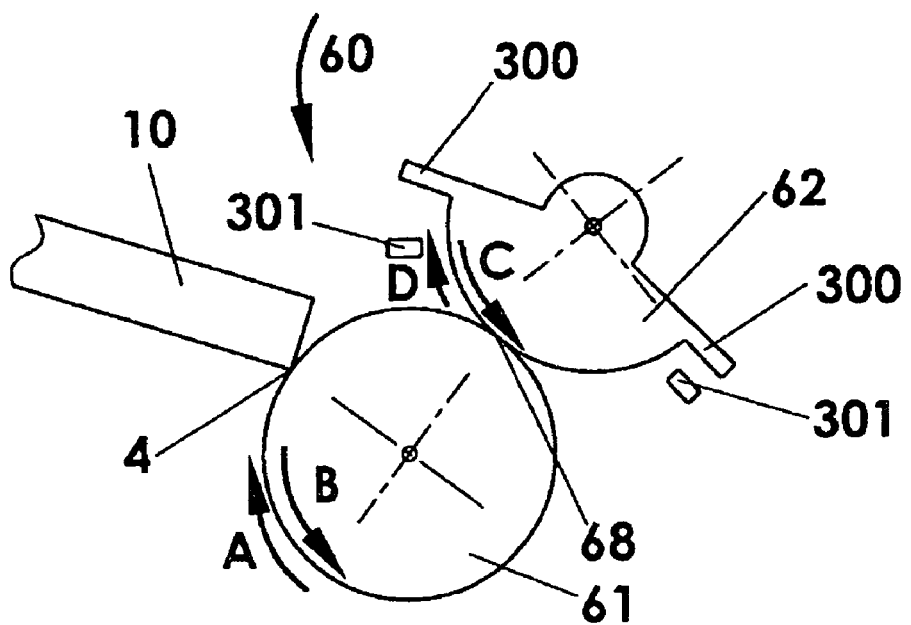
FIG. 7 shows a multistage piezoelectric drive system having limited range of motion.

FIG. 7 illustrates a further embodiment of a multistage piezoelectric drive system 60 comprising a vibratory element 10 and first and second driven elements 61 and 62, respectively. The vibratory element 10 has a selected contacting portion 4 for engaging the first driven element 61. The first and second driven elements are geared together by frictional contact in a mutual contact zone 68 so that the second driven element 62 can move in direction of arrow C if the first driven element 61 moves in direction of arrow A, or the second driven element 62 can move in direction of arrow D if the first driven element 61 moves in direction of arrow B.

In this embodiment, the second driven element 62 is a cam element having a semi-circular shape and further comprises limit stop elements 300 at peripheral ends of the cam that prevent motion of the second driven element 62 past blocking elements 301 that are preferably fixed to a base (not shown) for the drive system 60. The limit stop elements 300 and the blocking elements are arranged to allow a selected range of motion of the second driven element 62. Bearings, supports and mounts are not shown in the FIG. 7 for simplicity. The vibratory element 10 and the first driven element 61 are preferably resiliently urged against each other and/or the first driven element 61 and the second driven element 62 are preferably resiliently urged against each other by resilient members or springs (not shown). When the motion of the second driven element 62 is blocked in a direction by one of the blocking elements 301, the first driven element 61 may continue to move by sliding against the second driven element 62, provided that the vibrating element 10 moves the first driven element 61 with sufficient force to overcome the static friction forces in the contact zone 68 between the first and second driven elements 61, 62. It is thus possible to move the first and second driven elements 61, 62 into independent final positions or orientations by first moving the second driven element 62 until a limit stop element 300 prevents further motion of the second driven element 62 in that direction, and to then move the first driven element 61 with respect to the second driven element 62 while the second driven element 62 is temporarily immobilized by the limit stop element 300 and the blocking element 301. This process may be repeated as often as needed.

Limit stop elements 300 can also be placed on the first driven element 61. It may be preferable to place limit stop elements 300 on the vibratory element 10 if it is the vibratory element 10 that moves with respect to a preferably fixed driven element 61.

It is further believed possible to configure the multistage piezoelectric drive system 60 of FIG. 7 to move the vibratory element 10 and the first and second driven elements 61, 62 relatively to each other and independently from each other by selected vibrations of the selected contacting portion 4 on the vibratory element 10 and/or vibrations of the mutual contact zone 68 between driven elements 61, 62. The selected vibrations of the selected contacting portion 4 and/or the mutual contact zone 68 are preferably elliptical vibrations or stick-slip vibrations.

Figure 8:
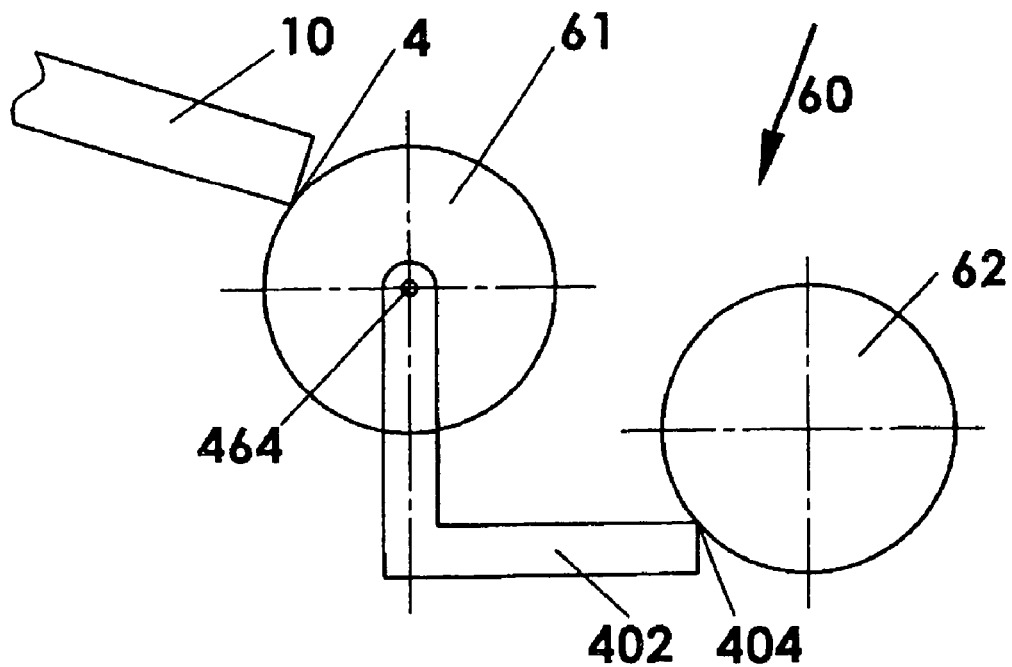
FIG. 8 is a schematic of a further multistage piezoelectric drive system.

FIG. 8 shows a further preferred configuration of a multistage, preferably piezoelectric, vibratory drive system 60. The system comprises a vibratory element 10 having a first selected contacting portion 4 in driving engagement with a first driven element 61. The first driven element 61 is movably supported by a support element 402. As shown in FIG. 8, the first driven element 61 is a disk that is movably supported by a rotational bearing 464, e.g. a ball bearing, in the support element 402. The support element 402 comprises a second selected contacting portion 404 that is in driving engagement with a second driven element 62. The first and second driven elements 61 and 62, respectively, can have other shapes than the ones shown and may also be a linearly movable and linearly supported driven elements. The second selected contacting portion 404 is preferably but not necessarily located at a distal end of the support element 402. The support element 402 has preferably an elongated shape or is L-shaped but can also have other shapes.

The vibratory element 10 and the first driven element 61 are preferably urged together by a resilient member or spring (not shown) that is on or is attached to the vibratory element 10 and/or by a resilient member or spring (not shown) that is on or is attached to the support member 402 to maintain sufficient frictional contact at the first selected contacting portion 4 for moving the first driven element 61. The second driven element 62 and the support element 402 are preferably urged together by a resilient member or spring (not shown) that is on or is attached to the support element 402 and/or by a resilient member or spring (not shown) that is on or is attached to a support or bearing (not shown) for the second driven element 62 to maintain sufficient frictional contact at the second selected contacting portion 404 for moving the second driven element 62. A person skilled in the art can devise resilient elements that are appropriate for these purposes.

The first selected contacting portion 4 vibrates when an electric signal is applied to the vibratory element 10. These selected contacting portion 4 vibrations are first transmitted into the first driven element 61 and then into the support element 402 and in particular to the second selected contacting portion 404 that lies on the support element 402. The support element 402 preferably comprises a resonator for amplifying vibrations of the second selected contacting portion 404.

It is possible to configure the support element 402 to move the second driven element 62 in incremental steps in a selected direction by elliptical, stick-slip, impact or other vibrations of the second selected contacting portion 404. The vibrations of the support element 402 occur in response to vibrations of the vibratory element 10 when an electric signal is applied to the vibratory element 10.

Various combinations of electric signals and resulting vibrations of the second selected contacting portion 404 are believed possible. For example, the electric signal may be fundamentally sinusoidal or fundamentally skewed triangular and the second selected contacting portion 404 vibrations may be stick-slip and preferably elliptical or impact vibrations.

It is possible to configure the vibratory drive system 60 so that the first driven element 61 is moved in one or more directions by vibrations of the first contacting portion 4, preferably by elliptical, stick-slip, or impact vibrations of the first selected contacting portion 4. It is further possible to configure the vibratory drive system 60 so that the second driven element 62 is moved preferably in more than one direction, and preferably in two opposite directions, by vibrations of the second selected contacting portion 404, and preferably by elliptical or impact vibrations and less preferably by stick-slip vibrations of the second selected contacting portion 404. The vibrations of the first and second selected contacting portions 4, 404 are in response to the vibrations of the vibratory element 10 when an electric signal is applied to the vibratory element 10. The vibratory drive system 60 is preferably configured such that the first and second driven elements 61, 62 can be moved independently. The vibratory drive system 60 is further preferably configured such that the first and second driven elements 61, 62 can be moved simultaneously.

There is thus provided a multistage vibratory drive system 60 for independently moving first and second driven elements 61, 62, preferably in incremental steps in individual, selected directions. The drive system 60 comprises a vibratory element 10 having a selected contacting portion 4 in driving engagement with a first driven element 61 so that the vibratory element 10 forms a vibratory, and preferably piezoelectric, motor for the first driven element 61. The vibrations of the vibratory element 10 are transmitted into the first driven element 61. A support element 402 is provided for the first driven element 61 and transmits vibrations from the first driven element 61 to a second selected contacting portion 404 that is in driving engagement with the second driven element 62. The second selected contacting portion 404 is preferably located on the support element 402 but may also be located on other structural elements that are in vibrating communication with the support element 402. In particular, the second selected contacting portion 404 could be located on a resonator that is excited to vibrate by vibrations that are generated by the vibratory element 10 and that are transmitted through the first driven element to the support element 402 and from there to said resonator.

Figure 11:
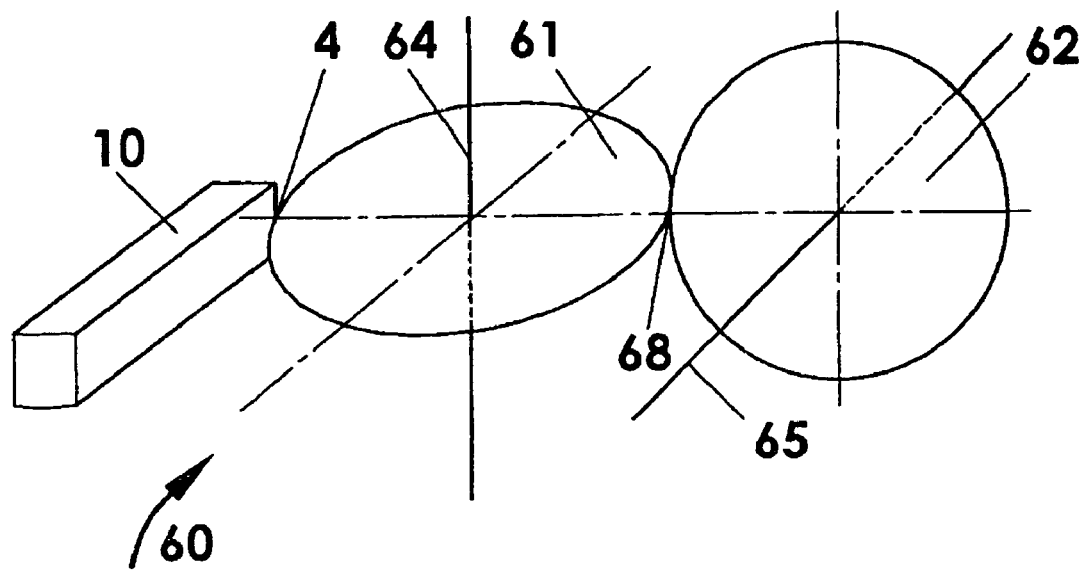
FIG. 11 shows a schematic of a further multistage piezoelectric drive system.

FIG. 11 shows a schematic of a further embodiment of a multistage vibratory drive system 60 that comprises a vibratory element 10 having a selected contacting portion 4 in driving engagement with a first driven element 61, the first driven element 61 being in frictional engagement with a second driven element 62 at a mutual contact zone 68: Only a portion of a vibratory element 10 is shown in FIG. 11. In this embodiment, the first driven element 61 is attached to a first axle 64 and the second driven element 62 is attached to a second axle 65. The first and second driven elements 61 and 62 are shown as flat, thin rigid disks for the sake of illustration but can have other shapes and sizes, such as thick disks, wheels, cylindrical drums, etc. The first axle 64 is perpendicular to the first driven element 61, and the second axle 65 is perpendicular to the second driven element 62. First axle 64 and second axle 65 are not parallel to each other, and are preferably perpendicular to each other. The first and second driven elements 61, 62, as well as the vibratory element 10 and the first driven element 61 are resiliently urged together by resilient elements (not shown) that preferably comprise springs. Also, bearings, mounts and supports for completing the drive system 60 are not shown for simplicity.

The vibratory element 10 is configured to move the first driven element 61 by vibrations of the selected contacting portion 4. The vibratory element 10 is configured to move the first driven element 61 by vibrations of the selected contacting portion 4 when an electric signal is applied to the vibratory element 10. The selected contacting portion 4 vibrations that move the first driven element preferably lie in a plan that is perpendicular to the first axle 64. The vibratory element 10 is preferably configured so that it can rotate the first driven element 61 about the center axis of axle 64 in either direction by selecting an appropriate electric signal that is applied to the vibratory element 10. Since first axle 64 and second axle 65 are not parallel to each other, the first and second driven elements 61, 62 are oblique to each other, which causes additional frictional resistance in their mutual contact zone 68 so that the vibratory element 10 needs to move the first driven element with sufficient driving force to overcome that frictional resistance.

The vibratory element 10 also generates vibrations that are transmitted through the selected contacting portion 4 into the first driven element 61 to the mutual contact zone 68. It is believed possible to configure the vibratory drive system 60 so that these vibrations of the mutual contact zone 68 reduce or remove the frictional resistance that opposes motions of the first driven element 61. It is further believed possible to configure the components of the vibratory drive system 60 so that the first driven element 61 vibrates at the mutual contact zone 68 to move, i.e., rotate about the center axis of the second axle 65, the second driven element 62 by said mutual contact zone 68 vibrations that occur in response to vibrations generated by the vibratory element 10. The mutual contact zone 68 vibrations preferably lie in a plane that is perpendicular to the second axle 65 and are preferably elliptical or impact vibrations, but can also be other vibrations.

Figure 12:
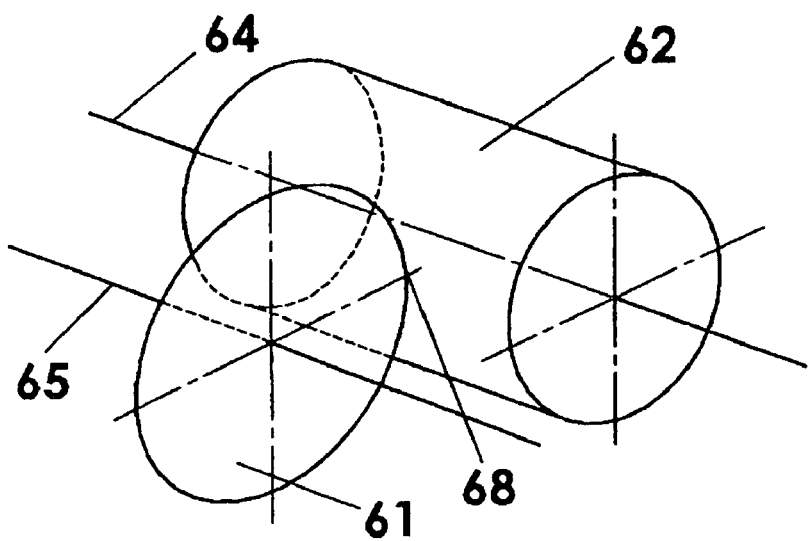
FIG. 12 is the schematic of a friction gear comprising a disc and a drum.

FIG. 12 shows a variation of FIG. 11 in the way that the first and second driven elements 61, 62 with first and second axles 64, 65 and mutual contact zone 68 are arranged. The vibratory element 10 that is in driving engagement with the first driven element 61 is not shown for simplicity. In this variation of the embodiment in FIG. 11, the second driven element 62 has the shape of a preferably elongated cylindrical drum. If axles 64 and 65 are parallel to each other, the configuration can act as a friction gear that causes one driven element to rotate when the other driven element rotates. If axles 64 and 65 oblique to each other, the configuration can act as a friction gear that causes one driven element to rotate and translate, i.e., to perform a screwing motion about axles 64 or 65, when the other driven element rotates. Bearings and support elements for axles 65, 65 to guide such screwing motions are not shown.

It is believed possible to configure the vibratory drive system 60 so that the vibratory element 10 causes vibrations in the mutual contact zone 68 between the first driven element 61 and the second driven element 62 that move, i.e., translate, the second driven element 62 with respect to the first driven element 61 along first axle 64 or second axle 65. The mutual contact zone 68 vibrations preferably lie in a plane that is perpendicular to the first axle 64, or more preferably lie in a plane that is perpendicular to the second axle 65. This translating motion is caused by mutual contact zone 68 vibrations and is preferably independent of the rotational motion that is transmitted by the friction gearing. There is thus provided a vibratory drive system 60 that has first and second driven elements 61, 62 in a rotational friction-gear configuration, wherein the vibratory drive system 60 has the additional degree of freedom of translating the second driven element 62 along its axis of rotation by way of vibrations of the mutual contact zone 68 between the first and second driven elements 61, 62. In particular, it is possible to translate the second driven element 62 in relation to the first driven element 61 to an extent where the mutual contact is completely lost, which leads to a defined separation of the first and second driven element engagement.

Figure 13:
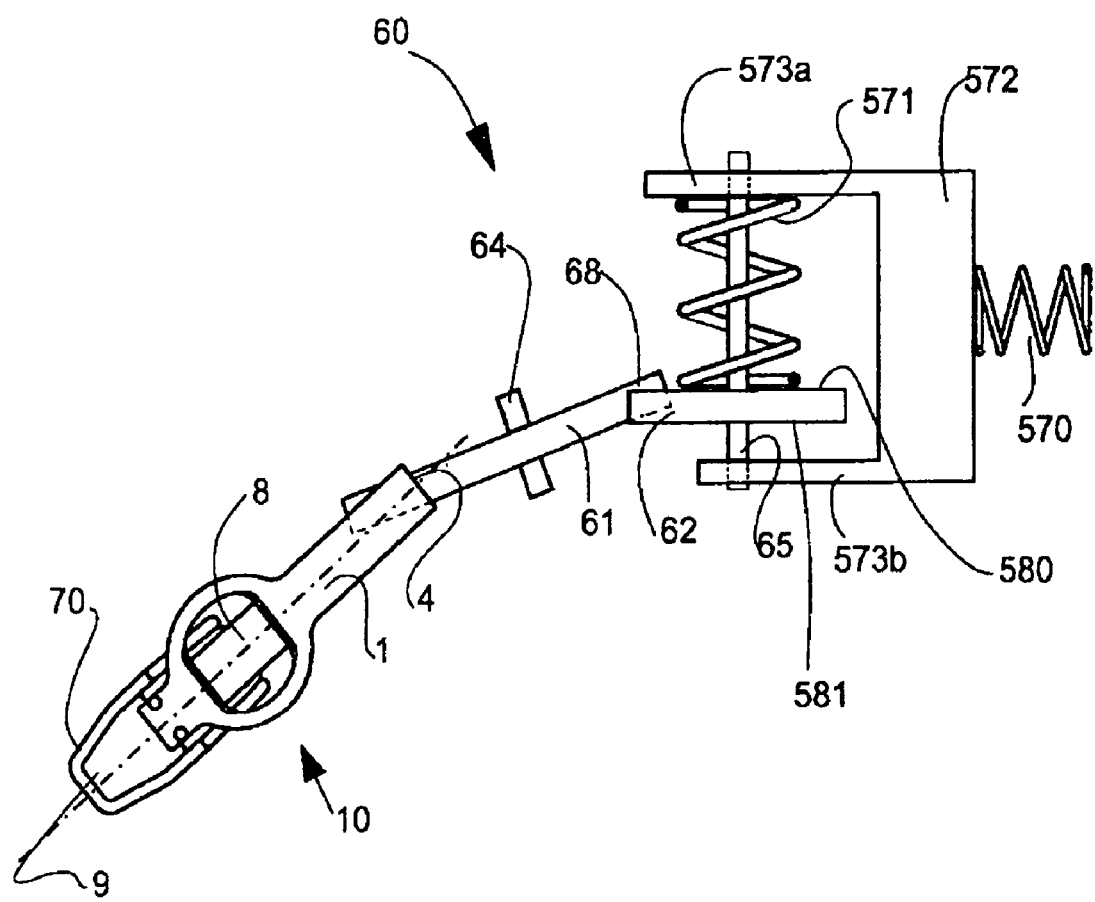
FIG. 13 is a multistage piezoelectric drive system with multiple modes of motion.

FIG. 13 shows a further embodiment of a multistage vibratory drive system 60 and also illustrates further preferable variations. Here, the vibratory element 10 has a longitudinal symmetry axis 9 and comprises a resonator 1 and a piezoelectric element 8 that is held in an opening of the resonator 1. The vibratory element 10 is mounted by a resilient element 70 to a base (not shown). The resilient element 70 urges a selected contacting portion 4 on the resonator 1 against a first driven element 61. Such a vibratory element is disclosed in U.S. patent application publication U.S. 2005/0127790, the entire contents of which are incorporated herein by reference. This vibratory element 10 can also be used in other multistage vibratory drive system 60 embodiments.

The selected contacting portion 4 on the resonator 1 is in driving engagement with the cylindrical first driven element 61 that has a first axle 64. The embodiment of FIG. 13 illustrates that the symmetry axis 9 of the vibratory element 10 and the first axle 64 need not necessarily be perpendicular to each other, although it is often preferable that the symmetry axis 9 and the first axle 64 are perpendicular in order to maximize the driving potential of the vibratory element 10. The vibratory element 10 shown here is configured to move, i.e., rotate, the first driven element 61 in either direction about the first axle 64 by applying fundamentally sinusoidal electric signals to the vibratory element 10. Other vibratory elements 10 could also be used to achieve the desired motion of the first driven element 61.

The vibratory drive system further comprises a second driven element 62, which here is a wheel with second axle 65. The second axle 65 is supported on either side of the second driven element 62 by bearings. These bearings are set into legs 573a,b that are located on opposite sides of a support element 572 for the second driven element 62. The bearings allow the second axle 65 to rotate about its longitudinal axis and to translate along its longitudinal axis. Limit elements (not shown) may be needed in order to prevent the second axle 65 from falling out its bearings when the second axle 65 is translated too far.

A resilient element 570, such as a spring that is mounted to the support element 572, urges the second driven element 62 against the first driven element 61 so that the first and second driven elements 61, 62 are maintained in frictional engagement at a mutual contact zone 68 at the peripheral surfaces of the first and second driven elements 61, 62. First and second axles 64 and 65 are not parallel with respect to each other so that the second driven element 62 is both rotated and translated due to friction when the first driven element 61 is rotated by vibrations of the vibratory element 10.

A spring element 571 is interposed between a first lateral surface 580 of the second driven element 62 and the leg 573a of the support element 572. The second driven element 62 has a second lateral surface 581 that is opposite to the first lateral surface 580 and that faces leg 573b. The spring element 571 preferably comprises a coil spring that encircles the second axle 65.

In a reference position, the second driven element 62 preferably abuts leg 573b with its second lateral surface 581. Attributable to the first and second axles 64, 65 not being parallel, the second driven element 62 is rotated in a second direction by the first driven element 61 when the first driven element 61 is rotated in a first direction by vibrations of the vibratory element 10, and the second driven element 62 is simultaneously also translated towards leg 537a so that the spring element 571 is compressed. When the first driven element 61 is rotated opposite to the first direction by vibrations of the vibratory element 10, the second driven element 62 is rotated by the first driven element 61 opposite to the second direction and is also translated towards leg 537b so that the spring element 571 is decompressed. In this manner, the rotation angle of the second driven element 62 and the position of the second driven element 62 in between the legs 573a,b are correlated by a gearing effect, i.e., the orientation and position of the second driven element 62 are not independently selectable so far.

It is believed possible to use the vibratory element 10 to also generate vibrations in the first driven element 61 that are sufficient to temporarily reduce, or preferably eliminate, the frictional forces in the mutual contact zone 68 between the first and second driven elements 61, 62 that hold the resilient forces of the compressed spring element 571 in balance. As a result, the spring element 571 relaxes and the resilient force of the spring element 571 translates the second driven element 62 towards leg 537b, preferably without rotation of the second driven element 62. Therefore, by judiciously selecting the electric signals that cause the vibratory element 10 to vibrate and by judiciously selecting their individual durations, it may be possible to rotate and translate the second driven element 62 into an individually selectable final position and orientation, wherein the final position and orientation are independent of each other, and wherein the final position and orientation are also independent of the orientation angle of the first driven element 61.

If the second driven element 62 is translated too far, it may loose driving contact with the first driven element 61 unless this is prevented by further limiting elements (not shown). But this may also constitute a desirable feature.

Figure 14:
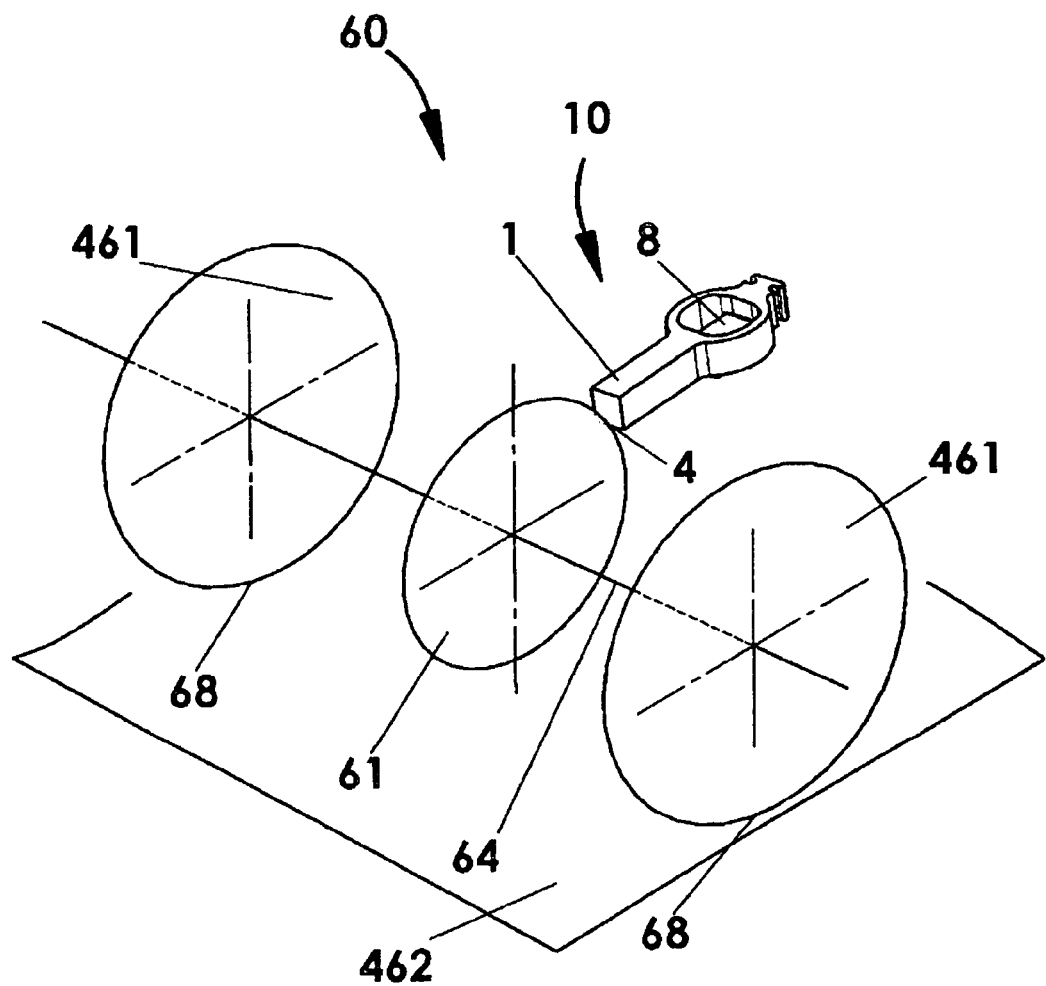
FIG. 14 schematically shows a drive axle for use in a vehicle, preferably in a toy vehicle.

FIG. 14 shows a further preferred embodiment of a multi-stage vibratory drive system 60 as a schematic. In this embodiment, the second driven element is a fixed plane 462 and the vibratory element 10 and the first driven element 61 move in relation to that plane 462.

The vibratory element 10 shown here comprises a resonator 1 and a piezoelectric element 8 for vibrating the resonator 1 when an electric signal is applied to the piezoelectric element 8. The resonator 1 has a selected contacting portion 4 in driving engagement with a rotary first driven element 61. An axle 64 connects the rotary first driven element 61 to wheels 461 on either side of the first driven element 61 so that the first driven element 61, the axle 64, and the wheels 461 are all coaxial. The wheels 461 are in rolling contact with the plane 462 at contact zones 68 with the plane 462.

Figure 15:
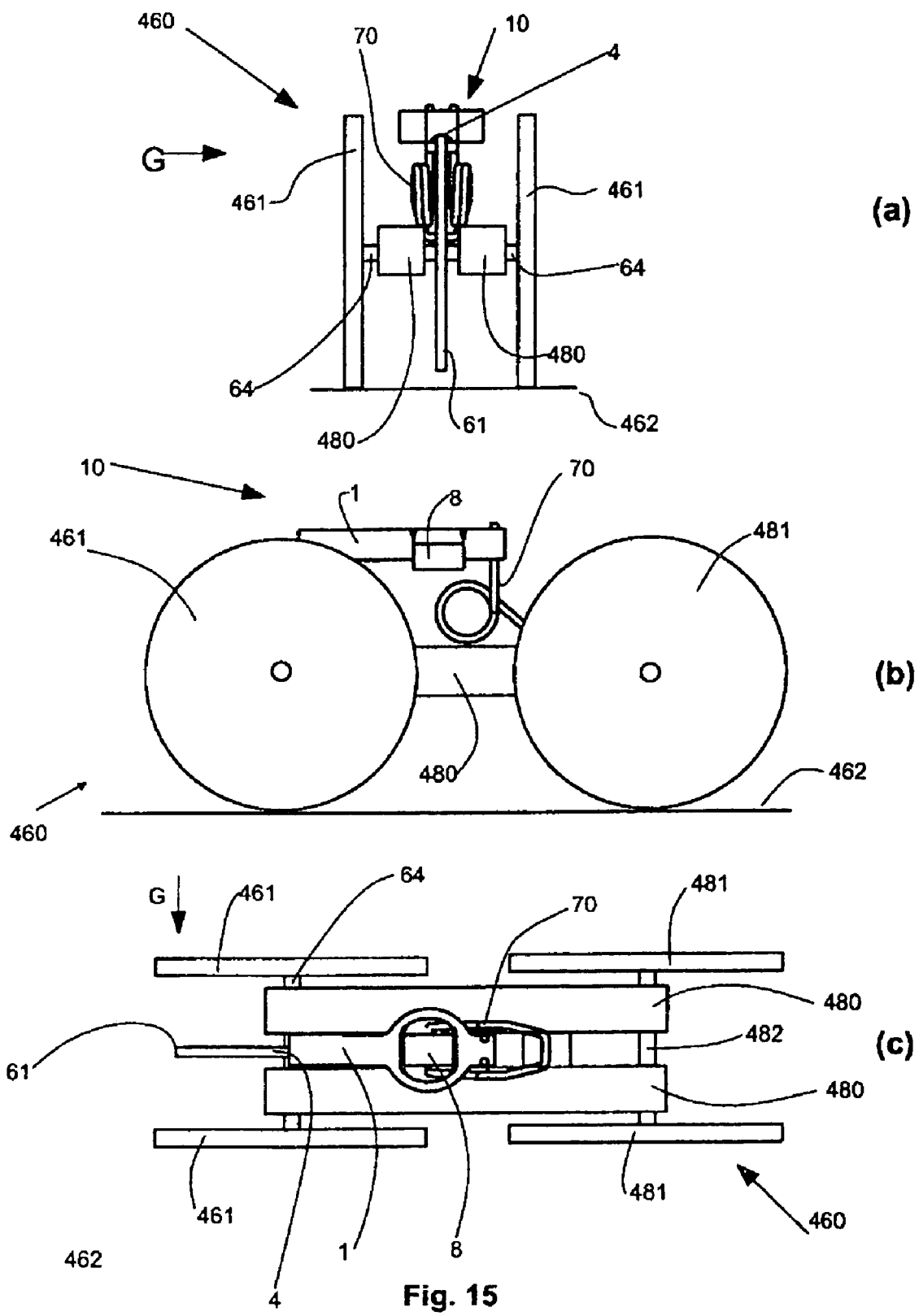
FIGS. 15a, b, and c, show different views of a toy vehicle.

Not shown are mounting elements for mounting the vibratory element 10 in relation to the axle 64, bearings for the axle 64, and other elements for turning this embodiment into a workable vehicle. FIGS. 15*a*, *b*, and *c* show such a vehicle 460 and show more of the missing elements.

FIG. 15*a* is a frontal view of the vehicle 460, FIG. 15*b* is a side view of the vehicle 460, and FIG. 15*c* is a bird's eye view of the vehicle 460. Apart from the vibratory element 10, the rotary first driven element 61, axle 64, and wheels 461, from FIG. 14, the vehicle 460 also comprises two elongated parallel vehicle frame elements 480 that are connected to each other and comprise bearings for the axle 64. The frame elements 480 are located between the wheels 461. The vibratory element 10 also has a resilient spring element 70 for mounting the vibratory element 10 to the frame elements 480. The mount between the spring element 70 and the frame elements 480 is not shown.

The vehicle 460 also comprises a second axle 482 with wheels 481 coaxially attached on either end of axle 482. The frame elements 480 also comprise bearings for second axle 482 so that the wheels 481 can rotate freely. The first axle 64 and the second axle 482 are located at opposing ends of the frame elements 480. Further preferred embodiments of the vehicle 460 have wheels 461 or 481 that can be steered but no such embodiment are shown here.

The vibratory element 10 drives the vehicle 460 forward or backward by vibrations of the selected contacting portion 4, which rotate the first driven element 61, which makes the wheels 461 roll on the plane 462. Unless there is slippage, this rolling motion is a geared motion between the plane 462 and the wheels 461, which are rigidly connected to the first driven element 61.

The friction forces that occur in the mutual contact zone 68 between the wheels 461 and the plane 462 are affected by the vibrations from the vibratory element 10 that get transmitted through the first driven element 61 to the wheels 461. In particular, the vibratory element 10 also causes the wheels 461 to vibrate. In particular, the vibratory element 10 vibrations can be configured so that the vehicle 460 can be pushed by an external agent in direction of the axle 64 so that the vehicle slides over the plane 462 with a force that is less than if the vibratory element 10 would not provide these vibrations. In other words, the lateral friction force on the wheels 461 may be reduced by the vibratory element 10 vibrations that get transmitted to the wheels 461. Therefore, in the presence of a lateral force G on the vehicle 460, the vehicle 460 can change its driving direction by vibrating the driven element 10 with vibrations, and preferably with vibrations of a selected frequency, that reduce the lateral frictional force on the wheels 461 and cause the vehicle 460 to steer or veer preferably in direction of the lateral force G. The lateral force G is represented by the arrow G in FIGS. 16*a* and 16*c*. Vehicle 460 steering is thus achieved by selectively yielding to an external agent such as to a lateral urging force.

In one preferred embodiment, the lateral urging force G is provided by gravity. A track system 600 for guiding the vehicle 460 is presented in FIGS. 16*a* and 16*b*. The Track system 600 uses, in part, gravity as the source of the lateral force G for selectively steering the vehicle 460.

Figure 16:
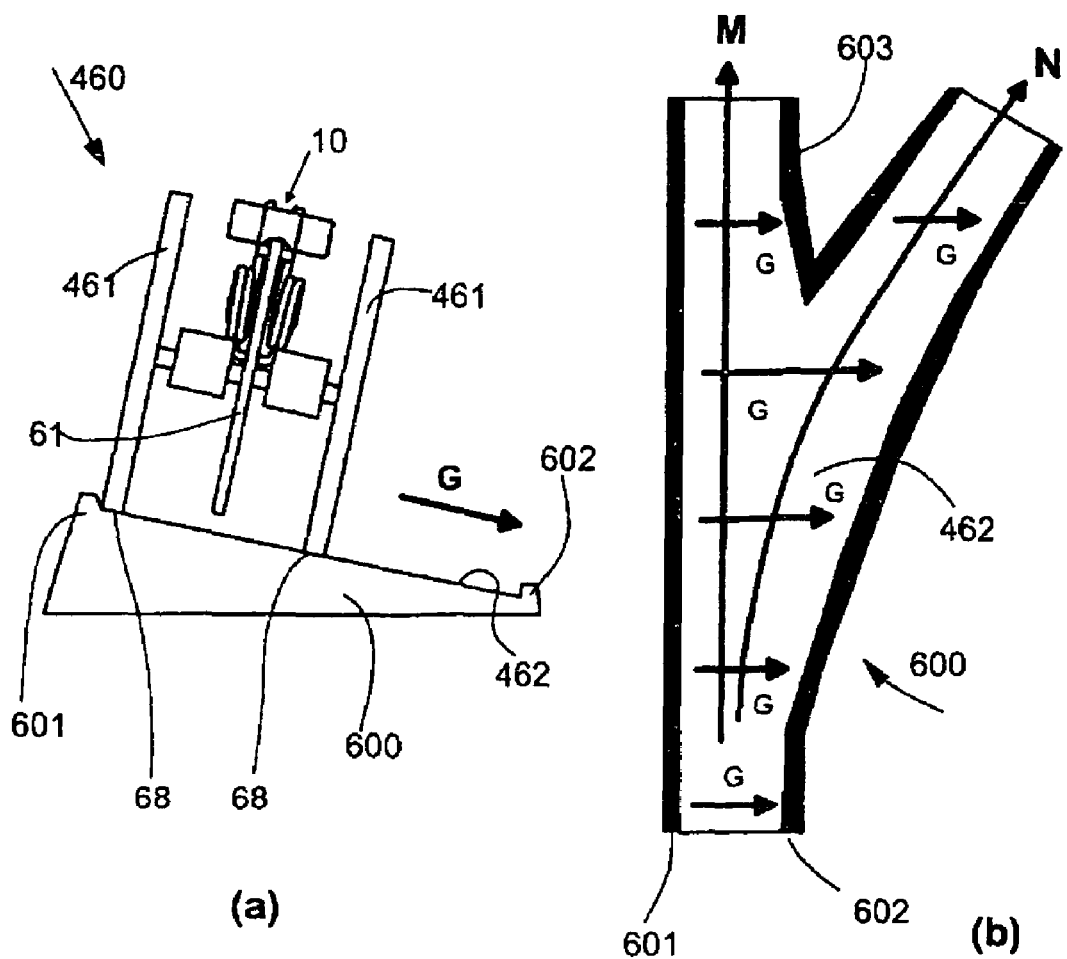
FIGS. 16a and 16b show a toy vehicle on a banked track element.

FIG. 16*a* shows a track 600 that comprises a plane driving surface 462 for the vehicle 460. The track 600 also comprises raised curbs 601 and 602 that face each other and that border the driving surface 462 on two sides to restrict the vehicle 460 from leaving the boundaries defined by these raised curbs 601, 602. The driving surface 462 of track 600 is banked towards the raised curb 602 so that the vehicle 460 feels a lateral force G due to gravity when the vehicle 460 is driving parallel to the curb 601. The direction of the lateral force G is preferably perpendicular to the curb 601, which lies higher than the curb 602.

FIG. 16*b* shows the track 600 from a bird's eye perspective. The vehicle 460 is not shown but two alternative driving directions M and N for the vehicle 460 are shown. The first driving direction M follows the curb 601, which is shown to be straight but could also be curved. The second driving direction N follows the curb 602, which is shown to be curved but could also be straight.

In a preferred embodiment, the track 600 comprises a third raised curb 603 that is interposed in between distal portions of raised curbs 601 and 602. In the preferred embodiment shown, the third curb 603 has a portion that is parallel to curb 601, and further has a portion that is parallel to curb 602, and further has a continuous connecting portion in between. The third raised curb 602 serves to shape the driving surface 462 into a fork-shaped driving surface 462 which can serve as a switch track for the vehicle 460.

The vehicle 460 is placed at a proximal portion of the curb 601 between curbs 601 and 602. An electric signal is applied to the vibratory element 10 on the vehicle 460 to cause the wheels 461 of the vehicle 460 to revolve and to move, or drive, the vehicle 460 along curb 601. If is oriented along direction M, the vehicle 460 preferably follows direction M. On the other hand, if the vibratory element 10 vibrates in a manner that is sufficient to reduce the friction between the wheels 461 and the surface 462, the vehicle slips, slides, steers, or veers, towards the curb 602 due to the action of gravity-induced lateral force G. The friction-reducing vibrations of the vibratory element 10 are preferably created simultaneously with the vibrations that drive the vehicle 460. Due to the gravity-induced lateral motion of the vehicle 460, which is selectable by the electric signal to the vibratory element 10, the vehicle 460 is forced into another driving direction, and preferably into the driving direction N that follows the raised curb 602.

One advantage of the banked track 600 in combination with the vehicle 460 is that the vehicle 460 can change its driving direction without needing a steering mechanism for its wheels 461 and 481 by exploiting the various vibrations that are generated by one vibratory element 10 on the vehicle 460.

An automated toy drive system is a preferred application of the track system 600 in combination with a vehicle 460 that comprises a vibratory element 10, wherein the vibratory element 10 provides the vibrations for both driving the vehicle 460 and for allowing the vehicle 460 to be selectively steered.

The above description is given by way of example, and not limitation. Given the above disclosure, one skilled in the art could devise variations that are within the scope and spirit of the invention. The various features of this invention can be used alone, or in varying combinations with each other and are not intended to be limited to the specific combination described herein. Thus, the invention is not to be limited by the illustrated embodiments.

What is claimed is:

1. A multistage vibratory drive system, comprising a vibratory element and first and second driven elements, the vibratory element having a selected contacting portion in driving engagement with the first driven element and the first driven element being in frictional driving engagement with second driven element, wherein the selected contacting portion vibrates when a first electric signal is applied to the vibratory element and the first driven element moves in a first direction in response to these vibrations of the selected contacting portion;

the first driven element vibrates in response to vibrations of the selected contacting portion when a second electric signal is applied to the vibratory element and the second driven element moves in a second direction in response to these vibrations of the first driven element.

2. The vibratory drive system of claim 1, wherein the vibratory element comprises a resonator and at least one piezoelectric element vibrating the resonator.

3. The vibratory drive system of claim 2, wherein the first and second electric signals have fundamentally different frequencies.

4. The vibratory drive system of claim 2, wherein the first electric signal is fundamentally sinusoidal and the second electric signal is fundamentally skewed triangular.

5. The vibratory drive system of claim 2, wherein the first driven element vibrates in elliptical vibrations when the second electric signal is applied to the vibratory element and the second driven element moves in response to these elliptical vibrations of the first driven element.

6. The vibratory drive system of claim 2, wherein the first driven element vibrates in stick-slip vibrations when the second electric signal is applied to the vibratory element and the second driven element moves in response to these stick-slip vibrations of the first driven element.

7. The vibratory drive system of claim 1, wherein the second electric signal is fundamentally sinusoidal and the first electric signal is fundamentally skewed triangular.

8. The vibratory drive system of claim 7, wherein the first driven element does not move when the second electric signal is applied to the vibratory element.

9. A multistage vibratory drive system, comprising a vibratory element having a first selected contacting portion in driving engagement with a first driven element, the first driven element being movably supported by a support element other than the vibratory element, the support element having a second selected contacting portion in driving engagement with a second driven element, wherein the first selected contacting portion vibrates when a first electric signal is applied to the vibratory element, and the first driven element moves in a first direction in response to the vibrations of the first selected contacting portion, and wherein the first driven element, the support element, and the second selected contacting portion vibrate in response to the vibrations of the vibratory element when a second electric signal is applied to the vibratory element, and the second driven element moves in a second direction in response to the vibrations of the second selected contacting portion.

10. The vibratory drive system of claim 9, wherein the vibratory element comprises a resonator and at least one piezoelectric element vibrating the resonator.

11. The vibratory drive system of claim 9, wherein the support element comprises a resonator.

* * * * *